United States Patent
Lee et al.

(10) Patent No.: US 12,248,709 B2
(45) Date of Patent: Mar. 11, 2025

(54) STORAGE SERVER AND OPERATION METHOD OF STORAGE SERVER

(71) Applicant: SAMSUNG ELECTRONICS CO., LTD., Suwon-si (KR)

(72) Inventors: Jinwook Lee, Suwon-si (KR); Heeseok Eun, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 7 days.

(21) Appl. No.: 18/200,215

(22) Filed: May 22, 2023

(65) Prior Publication Data

US 2024/0069814 A1 Feb. 29, 2024

(30) Foreign Application Priority Data

Aug. 29, 2022 (KR) .................. 10-2022-0108512

(51) Int. Cl.
*G06F 3/06* (2006.01)

(52) U.S. Cl.
CPC ............ *G06F 3/067* (2013.01); *G06F 3/0604* (2013.01); *G06F 3/0655* (2013.01); *G06F 3/0664* (2013.01)

(58) Field of Classification Search
CPC ...... G06F 3/067; G06F 3/0604; G06F 3/0655; G06F 3/0664
See application file for complete search history.

(56) References Cited

U.S. PATENT DOCUMENTS

| | | | |
|---|---|---|---|
| 7,506,117 B2 | 3/2009 | Yamamoto et al. | |
| 8,600,952 B2 | 12/2013 | Blitzer et al. | |
| 9,552,263 B2 | 1/2017 | Andre et al. | |
| 10,108,689 B2 | 10/2018 | Cadarette et al. | |
| 10,133,619 B1 | 11/2018 | Nagpal et al. | |
| 10,684,939 B2 | 6/2020 | Conti et al. | |
| 10,956,276 B2 | 3/2021 | Danilov et al. | |
| 11,175,979 B2 | 11/2021 | Rayaprolu et al. | |
| 2016/0048433 A1* | 2/2016 | Andre ................ | G06F 11/0793 714/4.1 |
| 2017/0177427 A1* | 6/2017 | D'Amato ............. | G06F 11/079 |
| 2019/0114559 A1 | 4/2019 | Evans | |
| 2022/0035715 A1 | 2/2022 | Shpilyuck et al. | |
| 2022/0050754 A1 | 2/2022 | Liu et al. | |

* cited by examiner

*Primary Examiner* — Ryan Bertram
(74) *Attorney, Agent, or Firm* — Sughrue Mion, PLLC

(57) ABSTRACT

A method of operating a storage server which includes a plurality of storage devices and a storage node configured to control the plurality of storage devices is provided. The method includes grouping first virtual machines based on workload characteristics of the first virtual machines, to generate a virtual machine group table; receiving, from first storage devices, attribute information of the first storage devices, the first storage devices being allocated to the first virtual machines; collecting recovery information from the first storage devices; generating a recovery sequence table by determining recovery sequences based on the virtual machine group table, the attribute information, and the recovery information; and providing a corresponding recovery sequence to a second storage device of the plurality of storage devices, based on the recovery sequence table, the second storage device being allocated to a new second virtual machine different from the first virtual machines.

20 Claims, 20 Drawing Sheets

FIG. 8A

RST

RT1

| VMGroup1(C1) | |
|---|---|
| A1 | A2 |
| Recovery Operation 4 | Recovery Operation 2 |
| Recovery Operation 3 | Recovery Operation 3 |
| Recovery Operation 1 | Recovery Operation 1 |
| Recovery Operation 2 | Recovery Operation 4 |

RT2

| VMGroup2(C2) | |
|---|---|
| A1 | A2 |
| Recovery Operation 1 | Recovery Operation 4 |
| Recovery Operation 2 | Recovery Operation 3 |
| Recovery Operation 3 | Recovery Operation 2 |
| Recovery Operation 4 | Recovery operation 1 |

RT3

| VMGroup3(C3) | |
|---|---|
| A1 | A2 |
| Recovery Operation 3 | Recovery Operation 1 |
| Recovery Operation 4 | Recovery Operation 4 |
| Recovery Operation 1 | Recovery Operation 3 |
| Recovery Operation 2 | Recovery Operation 2 |

RT4

| VMGroup4(C4) | |
|---|---|
| A1 | A2 |
| Recovery Operation 2 | Recovery Operation 3 |
| Recovery Operation 1 | Recovery Operation 1 |
| Recovery Operation 3 | Recovery Operation 2 |
| Recovery Operation 4 | Recovery Operation 4 |

FIG. 8B

| VMGroup1(C1) | | | | | | |
|---|---|---|---|---|---|---|
| A1 | | | A2 | | | |
| Entry1 | Entry2 | Entry3 | Entry4 | Entry5 | Entry6 | |
| Recovery Operation 4 | Recovery Operation 4 | Recovery Operation 4 | Recovery Operation 2 | Recovery Operation 2 | Recovery Operation 2 | |
| Recovery Operation 3 | Recovery Operation 3 | Recovery Operation 1 | Recovery Operation 3 | Recovery Operation 3 | Recovery Operation 1 | |
| Recovery Operation 1 | Recovery Operation 2 | Recovery Operation 3 | Recovery Operation 1 | Recovery Operation 4 | Recovery Operation 3 | |
| Recovery Operation 2 | Recovery Operation 1 | Recovery Operation 2 | Recovery Operation 4 | Recovery Operation 1 | Recovery Operation 4 | |

RT1

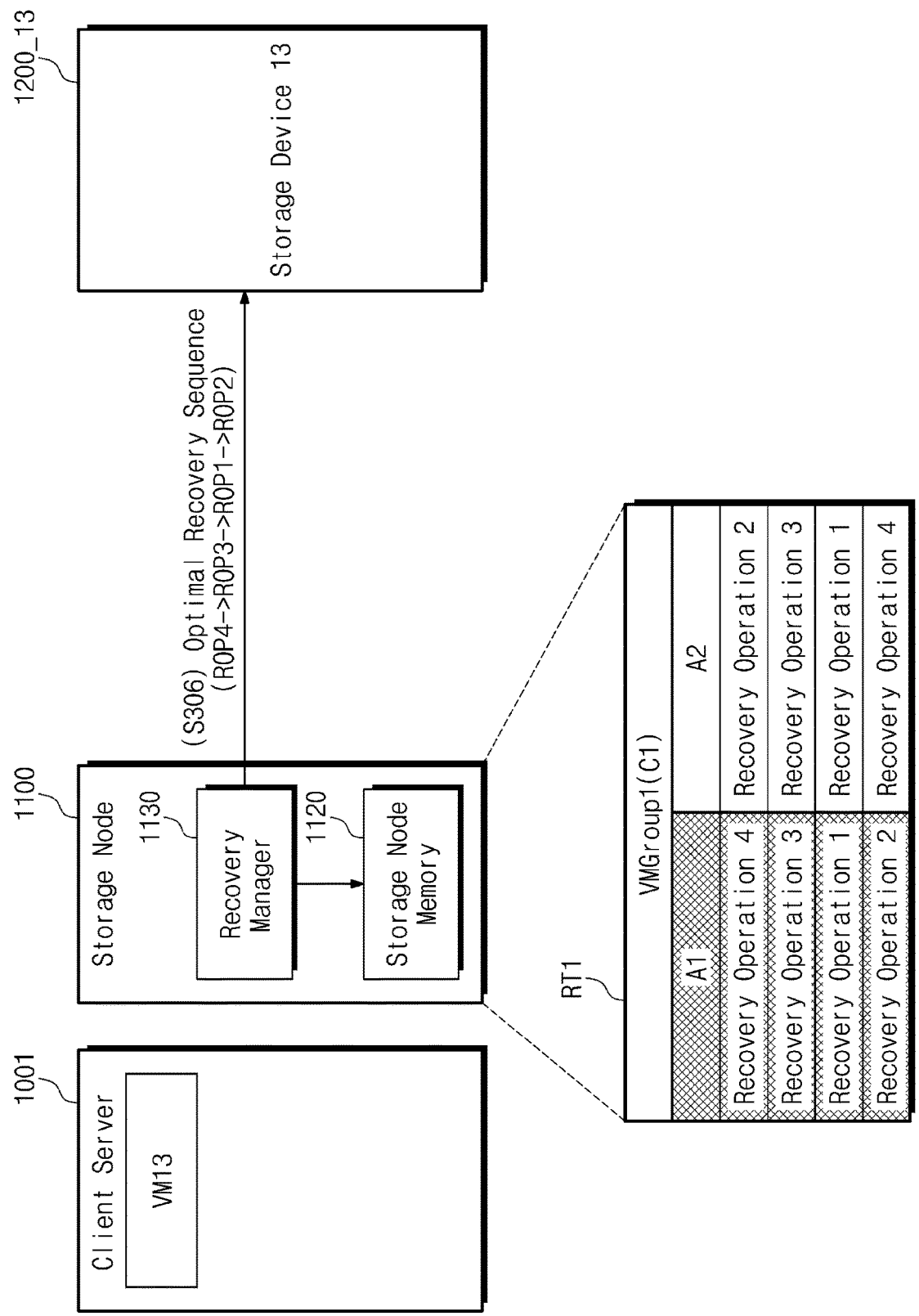

STORAGE SERVER AND OPERATION METHOD OF STORAGE SERVER

CROSS-REFERENCE TO RELATED APPLICATION(S)

This application claims priority under 35 U.S.C. § 119 to Korean Patent Application No. 10-2022-0108512 filed on Aug. 29, 2022, in the Korean Intellectual Property Office, the disclosures of which are incorporated by reference herein in their entireties.

BACKGROUND

Embodiments of the present disclosure described herein relate to a computer system, and more particularly, relate to a storage server and an operation method of the storage server.

A semiconductor memory is classified as a volatile memory, in which stored data disappear when a power is turned off, such as a static random access memory (SRAM) or a dynamic random access memory (DRAM), or a nonvolatile memory, in which stored data are retained even when a power is turned off, such as a flash memory, a phase-change RAM (PRAM), a magnetic RAM (MRAM), a resistive RAM (RRAM), or a ferroelectric RAM (FRAM).

A storage device refers to a device, which stores data under control of a host device, such as a computer, a smartphone, or a smart pad. The storage device includes a device, which stores data on a magnetic disk, such as a hard disk drive (HDD), or a device, which stores data in a semiconductor memory, in particular, a nonvolatile memory, such as a solid state drive (SSD) or a memory card.

The nonvolatile memory includes memory cells configured to store data. To increase the amount of data that can be stored in the storage device, efforts have been made to increase the number of bits that can be stored in each of memory cells. As the number of bits stored in each of the memory cells increases, the probability that errors occur at data stored in the memory cells may increase.

To guarantee the integrity of data stored in the memory cells, the recovery operation is frequently performed such that original data are recovered even when an error occurs at the data stored in the memory cells, which causes the reduction of performance of the server system.

SUMMARY

Embodiments of the present disclosure provide a storage server and an operation method of the storage server.

According to an embodiment, provided is a method of operating a storage server which includes a plurality of storage devices and a storage node configured to control the plurality of storage devices, the method including: grouping, by the storage node, first virtual machines based on workload characteristics of the first virtual machines, to generate a virtual machine group table; receiving, by the storage node from first storage devices of the plurality of storage devices, attribute information of the first storage devices, the first storage devices being allocated to the first virtual machines; collecting, by the storage node, recovery information from the first storage devices; generating, by the storage node, a recovery sequence table by determining recovery sequences based on the virtual machine group table, the attribute information, and the recovery information; and providing, by the storage node, a corresponding recovery sequence to a second storage device of the plurality of storage devices, based on the recovery sequence table, the second storage device being allocated to a new second virtual machine different from the first virtual machines.

According to an embodiment, provided is a storage server including: a plurality of storage devices; and a storage node including a recovery manager, and configured to control the plurality of storage devices, wherein the recovery manager includes: a workload analyzer configured to extract workload characteristics of first virtual machines by monitoring an input and an output between the first virtual machines and first storage devices, of the plurality of storage devices, allocated to the first virtual machines; a workload grouping manager configured to group the first virtual machines based on the workload characteristics and to generate a virtual machine group table; a storage analyzer configured to receive attribute information from the first storage devices and to determine storage attributes of the first storage devices based on the received attribute information; a recovery collector configured to collect recovery information from the first storage devices; a recovery sequence table generator configured to generate a recovery sequence table by determining recovery sequences based on the virtual machine group table, the storage attributes, and the recovery information; and a recovery sequence allocator configured to allocate a corresponding recovery sequence to a second storage device of the plurality of storage devices, the second storage device being allocated to a new second virtual machine, by referring to the recovery sequence table based on a workload characteristic of the second virtual machine and a storage attribute of the second storage device.

According to an embodiment, provided is a method of operating a storage server which includes a plurality of storage devices and a storage node configured to control the plurality of storage devices, the method including: grouping, by the storage node, first virtual machines based on workload characteristics of the first virtual machines, to generate a virtual machine group table; receiving, by the storage node, attribute information from first storage devices allocated to the first virtual machines; collecting, by the storage node, recovery information from the first storage devices; determining, by the storage node, recovery sequences based on the virtual machine group table, the attribute information, and the recovery information, to generate a recovery sequence table; receiving a recovery sequence request including a second workload characteristic and a second storage attribute from an external storage server over a network; and referring to the recovery sequence table and providing a corresponding recovery sequence to the external storage server based on the second workload characteristic and the second storage attribute.

BRIEF DESCRIPTION OF FIGURES

The above and other objects and features of the present disclosure will become apparent by describing in detail embodiments thereof with reference to the accompanying drawings.

FIGS. 8A and 8B are diagrams illustrating examples of a recovery sequence table according to an embodiment of the present disclosure.

FIGS. 10A to 10C are diagrams illustrating examples of an operation of a server system of FIG. 1.

DETAILED DESCRIPTION

Below, example embodiments of the present disclosure will be described in detail and clearly to such an extent that one skilled in the art easily carries out the present disclosure.

Below, for convenience of description, specific example embodiments are separately described, but the scope of the present disclosure is not limited thereto; it will be understood that various embodiments may be combined with each other or a part of one embodiment may be combined with a part of another embodiment.

Figure 1:
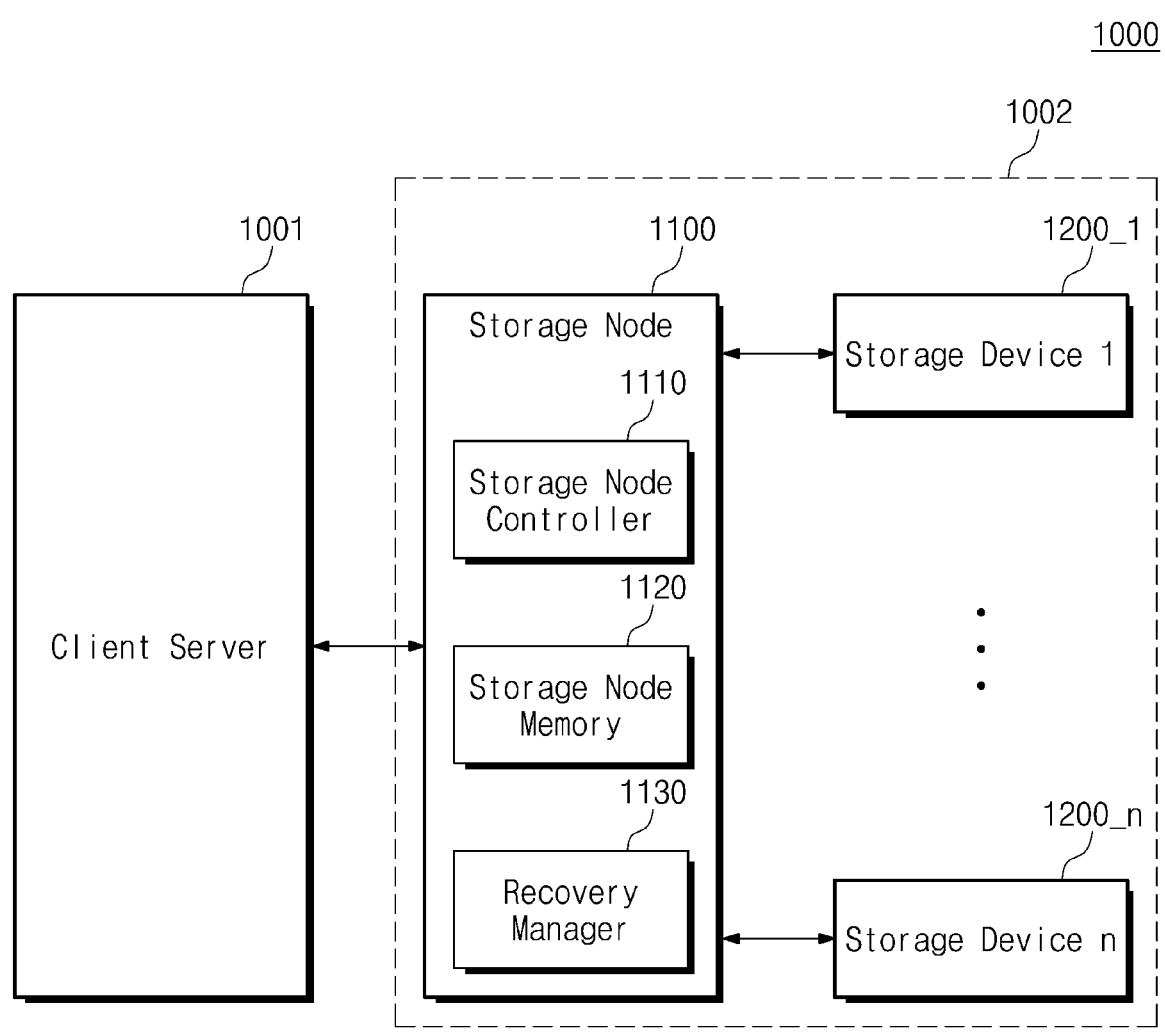
FIG. 1 is a block diagram illustrating a server system according to an embodiment of the present disclosure.

FIG. 1 is a block diagram illustrating a server system according to an embodiment of the present disclosure. Referring to FIG. 1, a server system (or referred to as a "computer system" or a "storage system") 1000 may include a client server 1001 and a storage server 1002. The server system 1000 may refer to a data center or a data storage center that performs the maintenance of various data and provides various services. The server system 1000 may be a search engine or a system for the operation of a database and may be a computing system available in various institutions. The server system 1000 may refer to a storage system that provides a cloud service or an on-premise service.

The client server 1001 may refer to a user, a user's terminal, or a user's computing system that uses various data-based services. The client server 1001 may store data in the storage server 1002 or may read data stored in the storage server 1002.

Based on a request of the client server 1001, the storage server 1002 may store data or may send data to the client server 1001. In an embodiment, the client server 1001 and the storage server 1002 may communicate with each other over a network (not illustrated).

The storage server 1002 may include a storage node 1100 and a plurality of storage devices 1200_1 to 1200_n. The storage node 1100 may be configured to manage the storage devices 1200_1 to 1200_n included in the storage server 1002. Under control of the storage node 1100, each of the plurality of storage devices 1200_1 to 1200_n may store data or may output the stored data. Each of the plurality of storage devices 1200_1 to 1200_n may be a high-capacity storage medium such as a solid state drive (SSD), but the present disclosure is not limited thereto.

The storage node 1100 may store data in the plurality of storage devices 1200_1 to 1200_n or may read data stored in the plurality of storage devices 1200_1 to 1200_n. For example, to store data in the plurality of storage devices 1200_1 to 1200_n, the storage node 1100 may send a write command and write data to each of the plurality of storage devices 1200_1 to 1200_n. Alternatively, to read data stored in the plurality of storage devices 1200_1 to 1200_n, the storage node 1100 may send a read command to each of the plurality of storage devices 1200_1 to 1200_n and may receive data from each of the plurality of storage devices 1200_1 to 1200_n.

In an embodiment, the storage node 1100 and the plurality of storage devices 1200_1 to 1200_n may communicate with each other based on a given interface. In an embodiment, the given interface may support at least one of various interfaces such as a universal serial bus (USB) interface, a small computer system interface (SCSI), a peripheral component interconnection (PCI) express (PCIe) interface, an advanced technology attachment (ATA) interface, a parallel ATA (PATA) interface, a serial ATA (SATA) interface, a serial attached SCSI (SAS) interface, a universal flash storage (UFS) interface, a nonvolatile memory express (NVMe) interface, and a compute express link (CXL) interface, but the present disclosure is not limited thereto.

The storage node 1100 may include a storage node controller 1110, a storage node memory 1120, and a recovery manager 1130. The storage node memory 1120 may function as a buffer memory for temporarily storing data to be transferred to the plurality of storage devices 1200_1 to 1200_n or data transferred from the plurality of storage devices 1200_1 to 1200_n. In an embodiment, the storage node memory 1120 may store data or information that is used by the recovery manager 1130. For example, the storage node memory 1120 may store a virtual machine group table VMGT and a recovery sequence table RST.

According to an embodiment, the storage node controller 1110 and the storage node memory 1120 may be implemented with separate semiconductor chips. Alternatively, in some embodiments, the storage node controller 1110 and the storage node memory 1120 may be implemented in the same semiconductor chip. As an example, the storage node controller 1110 may be one of a plurality of modules included in an application processor; in this case, the application processor may be implemented with a system on chip (SoC). Also, the storage node memory 1120 may be an embedded memory included in the application processor or may be a nonvolatile memory or a memory module disposed outside the application processor.

The storage node controller 1110 may manage an operation of storing data (e.g., write data) of a buffer area of the storage node memory 1120 to the storage devices 1200_1 to 1200_n or storing data (e.g., read data) of the storage devices 1200_1 to 1200_n to the buffer area.

In an embodiment, the recovery manager 1130 may provide an optimal recovery sequence to the plurality of storage devices 1200_1 to 1200_n. The recovery manager 1130 may generate and manage the virtual machine group table VMGT based on a workload characteristic of each virtual machine. The recovery manager 1130 may collect recovery information from the plurality of storage devices 1200_1 to 1200_n. The recovery manager 1130 may generate and manage the recovery sequence table RST based on the virtual machine group table VMGT, the recovery information, and storage attributes. The recovery manager 1130 may provide the optimal recovery sequence to a storage device allocated to a new virtual machine based on the recovery sequence table RST. An optimal recovery sequence providing method of the server system 1000 according to embodiments of the present disclosure will be described in detail with reference to the following drawings.

Figure 2A:
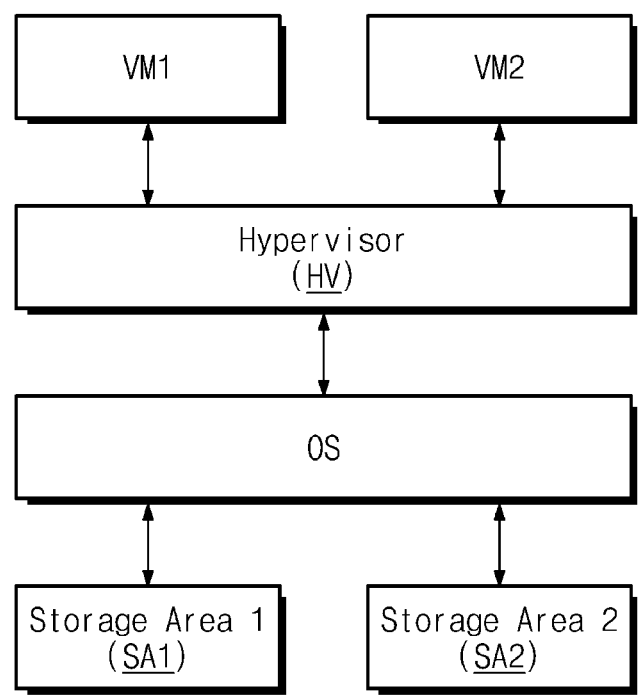
FIG. 2A is a diagram illustrating software layers of a server system of FIG. 1.

FIG. 2A is a diagram illustrating software layers of a server system of FIG. 1. Referring to FIG. 2A, an operating system OS, a hypervisor HV, a first virtual machine VM1, and a second virtual machine VM2 may be driven on the client server 1001. The operating system OS may refer to system software configured to control various hardware and resources included in the client server 1001, to drive various programs, and to support various services. The hypervisor HV may be a logical platform configured to drive the first and second virtual machines VM1 and VM2 that are executed in the client server 1001.

Each of the first and second virtual machines VM1 and VM2 may be driven in the client server 1001. In an embodiment, data associated with the first virtual machine VM1 may be stored in a first storage area SA1 of the storage server 1002, and data associated with the second virtual machine VM2 may be stored in a second storage area SA2 of the storage server 1002. In an embodiment, the first storage area SA1 may correspond to the first storage device 1200_1, and the second storage area SA2 may correspond to the second storage device 1200_2. Alternatively, the first storage area SA1 may correspond to a first namespace, and the second storage area SA2 may correspond to a second namespace. The namespace may refer to a storage area of the storage device, which are logically or physically classified. That is, the data that are managed by the first virtual machine VM1 may be logically or physically distinguished from the data that are managed by the second virtual machine VM2. Alternatively, the first storage area SA1 may correspond to a first zone namespace, and the second storage area SA2 may correspond to a second zone namespace. The zone namespace may refer to a namespace of the storage device, which is divided into a plurality of zones.

In an embodiment, the operating system OS and first and second containers (not illustrate) may be driven on the client server 1001. For example, data associated with the first container may be stored in the first storage area SA1 of the storage server 1002, and data associated with the second container may be stored in the second storage area SA2 of the storage server 1002. A relationship between the first and second containers and the first and second storage areas SA1 and SA2 may be identical or similar to the relationship between the first and second virtual machines VM1 and VM2 and the first and second storage areas SA1 and SA2, and thus, additional description will be omitted to avoid redundancy.

Figure 2B:
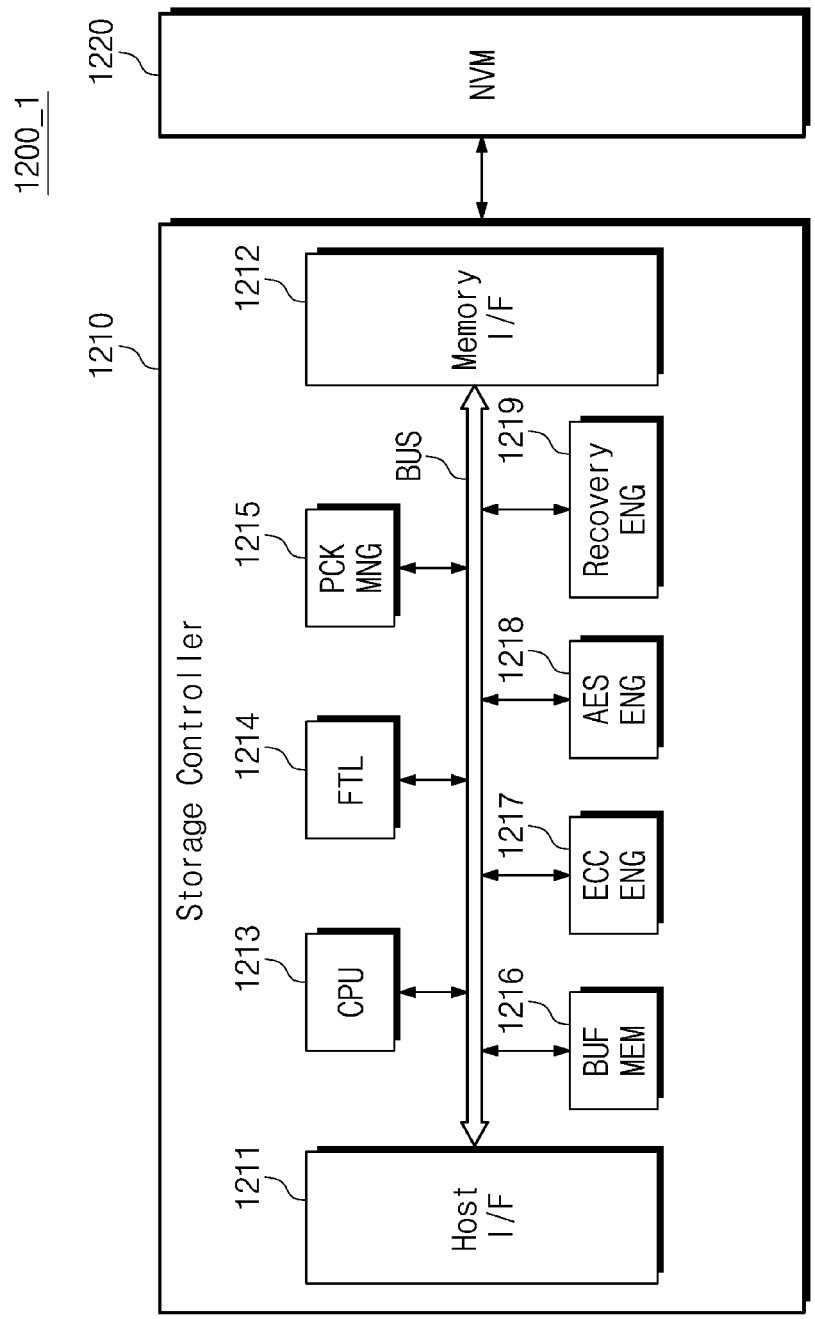
FIG. 2B is a block diagram illustrating a first storage device of FIG. 1 in detail.

FIG. 2B is a block diagram illustrating a first storage device 1200_1 of FIG. 1 in detail. Each of the remaining storage devices 1200_2 to 1200_n may be identical or similar to the first storage device 1200_1.

Referring to FIG. 2B, the storage device 1200_1 may include storage mediums for storing data based on a request from the storage node 1100. As an example, the storage device 1200_1 may include at least one of a solid state drive (SSD), an embedded memory, or a removable external memory. In the case where the storage device 1200_1 is the SSD, the storage device 1200_1 may be a device that complies with the non-volatile memory express (NVMe) standard. In the case where the storage device 1200_1 is the embedded memory or the external memory, the storage device 1200_1 may be a device that complies with the universal flash storage (UFS) or embedded multi-media card (eMMC) standard. Each of the storage node 1100 and the storage device 1200_1 may generate a packet that complies with a standard protocol applied thereto and may send the generated packet.

When a nonvolatile memory 1220 of the storage device 1200_1 includes a flash memory, the flash memory may include a two-dimensional (2D) NAND flash memory array or a three-dimensional (3D) (or vertical) NAND (VNAND) memory array. As another example, the storage device 1200_1 may be implemented with various kinds of different nonvolatile memories. For example, the storage device 1200_1 may include a magnetic RAM (MRAM), a spin-transfer torque MRAM (STT-MRAM), a conductive bridging RAM (CBRAM), a ferroelectric RAM (FeRAM), a phase change RAM (PRAM), a resistive RAM (RRAM), or at least one of various kinds of different memories.

A storage controller 1210 may include a host device interface 1211, a memory interface 1212, and a central processing unit (CPU) 1213. Also, the storage controller 1210 may further include a flash translation layer (FTL) 1214, a packet manager 1215, a buffer memory 1216, an error correction code (ECC) engine 1217, an advanced encryption standard (AES) engine 1218, and a recovery engine 1219. The storage controller 1210 may further include a working memory (not illustrated) to which the flash translation layer 1214 is loaded, and data write and read operations of nonvolatile memory 1220 may be controlled as the CPU 1213 executes the flash translation layer 1214.

The host device interface 1211 may exchange packets with the storage node 1100. The packet that is transferred from the storage node 1100 to the host device interface 1211 may include a command, data to be written in the nonvolatile memory 1220, and the like, and the packet that is transferred from the host device interface 1211 to the storage node 1100 may include a response to the command, data read from the nonvolatile memory 1220, and the like. The memory interface 1212 may provide the nonvolatile memory 1220 with data to be written in the nonvolatile memory 1220, and may receive data read from the nonvolatile memory 1220. The memory interface 1212 may be implemented to comply with the standard such as Toggle or ONFI (Open NAND Flash Interface).

The flash translation layer 1214 may perform various functions (or operations) such as address mapping, wear-leveling, and garbage collection. The address mapping operation refers to an operation of translating a logical address received from the storage node 1100 into a physical address to be used to actually store data in the nonvolatile memory 1220. The wear-leveling is a technology for allowing blocks in the nonvolatile memory 1220 to be used uniformly such that excessive degradation of a specific block is prevented. The wear-leveling may be implemented, for example, through a firmware technology for balancing erase counts of physical blocks. The garbage collection refers to a technology for securing an available capacity of the nonvolatile memory 1220 by erasing an existing block after copying valid data of the existing block to a new block.

The packet manager 1215 may generate a packet that complies with a protocol of an interface agreed with the storage node 1100 or may parse various kinds of information from the packet received from the storage node 1100. Also, the buffer memory 1216 may temporarily store data to be written in the nonvolatile memory 1220 or data read from the nonvolatile memory 1220. The buffer memory 1216 may be a component provided within the storage controller 1210; however, it may be possible to dispose the buffer memory 1216 outside the storage controller 1210.

The ECC engine 1217 may perform an error detection and correction function on data read from the nonvolatile memory 1220. In detail, the ECC engine 1217 may generate parity bits for the write data to be written in the nonvolatile memory 1220, and the parity bits thus generated may be stored in the nonvolatile memory 1220 together with the write data. When data are read from the nonvolatile memory 1220, the parity bits are read from the nonvolatile memory 1220 together with the read data and the ECC engine 1217 may correct an error of the read data by using the parity bits and may output the error-corrected read data.

The AES engine 1218 may perform at least one of an encryption operation and a decryption operation on data input to the storage controller 1210 by using a symmetric-key algorithm.

The recovery engine 1219 may perform recovery operations when a read error occurs. The recovery engine 1219 may perform the recovery operations based on a default recovery sequence. Before the optimal recovery sequence is received from the storage node 1100, the recovery engine 1219 may correct the read error by performing the recovery operation based on the default recovery sequence.

The recovery engine 1219 may store a result of performing the recovery operations. The recovery engine 1219 may store history information about the recovery operations thus performed in the buffer memory 1216. The recovery engine 1219 may store and manage recovery information. The recovery engine 1219 may send the recovery information to the storage node 1100 based on the request of the storage node 1100.

The recovery engine 1219 may receive the optimal recovery sequence from the storage node 1100. After receiving the optimal recovery sequence, the recovery engine 1219 may perform the recovery operations based on the optimal recovery sequence when the read error occurs. Accordingly, the reduction of performance of the storage device may be minimized.

Figure 3:
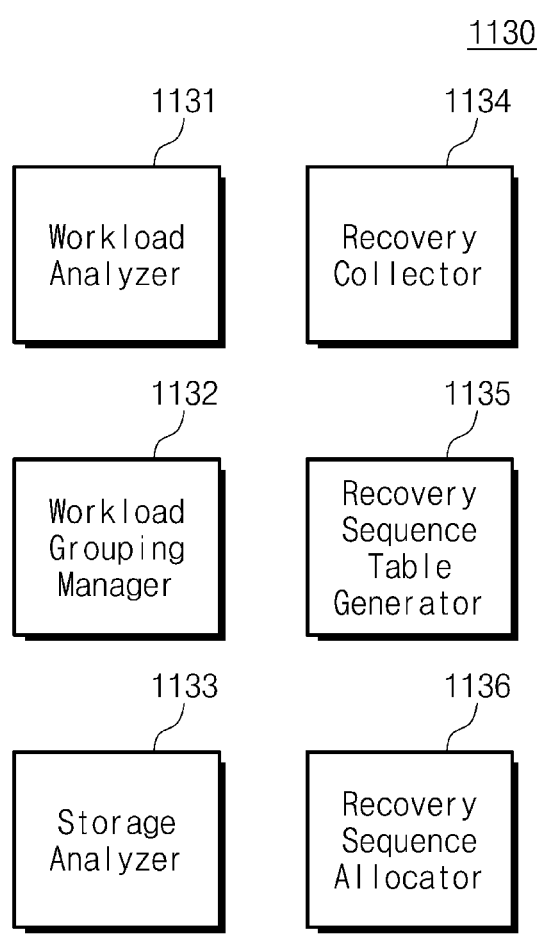
FIG. 3 is a block diagram illustrating a recovery manager of FIG. 1 in detail.

FIG. 3 is a block diagram illustrating a recovery manager of FIG. 1 in detail. Referring to FIGS. 1 and 3, the recovery manager 1130 may include a workload analyzer 1131, a workload grouping manager 1132, a storage analyzer 1133, a recovery collector 1134, a recovery sequence table generator 1135, and a recovery sequence allocator 1136.

The workload analyzer 1131 may detect and analyze a user input/output. For example, the workload analyzer 1131 may monitor the user input/output between the client server 1001 and the plurality of storage devices 1200_1 to 1200_n. It is assumed that the data associated with the first virtual machine VM1 are stored in the first storage device 1200_1. To extract the workload characteristic of the first virtual machine VM1, the workload analyzer 1131 may monitor or analyze the read/write request and data that are exchanged between the first virtual machine VM1 and the first storage device 1200_1.

The workload analyzer 1131 may extract the workload characteristic of a virtual machine based on a monitoring result (or analysis result). For example, the workload analyzer 1131 may determine whether the first virtual machine VM1 has a first workload characteristic C1.

The workload grouping manager 1132 may group virtual machines based on workload characteristics of the virtual machines. The workload grouping manager 1132 may classify virtual machines having similar workload characteristics as a group. The workload grouping manager 1132 may generate the virtual machine group table VMGT based on the workload characteristics. The virtual machine group table VMGT may include a workload characteristic and information about identifiers of virtual machines corresponding to the workload characteristic.

The storage analyzer 1133 may analyze attributes of the plurality of storage devices 1200_1 to 1200_n. For example, the storage analyzer 1133 may send an attribute information request to each of the plurality of storage devices 1200_1 to 1200_n. The storage analyzer 1133 may receive attribute information from each of the plurality of storage devices 1200_1 to 1200_n. The storage analyzer 1133 may determine the attribute of each of the storage devices 1200_1 to 1200_n based on the attribute information. The storage analyzer 1133 may transfer the determined storage attribute to the recovery sequence table generator 1135.

Because the storage attribute changes over time, the storage analyzer 1133 may monitor the storage attribute of each of the storage devices 1200_1 to 1200_n. To change the optimal recovery sequence based on the changed storage attribute, the storage analyzer 1133 may periodically request the storage attribute from each of the plurality of storage devices 1200_1 to 1200_n. When the change condition of the optimal recovery sequence is satisfied, the storage analyzer 1133 may notify the recovery sequence allocator 1136 that a change condition is satisfied.

The recovery collector 1134 may collect the recovery information (e.g., recovery result) from the plurality of storage devices 1200_1 to 1200_n. For example, to generate the recovery sequence table RST, the recovery collector 1134 may collect the recovery information during a given time period. The recovery collector 1134 may periodically request the recovery information from the plurality of storage devices 1200_1 to 1200_n. The recovery collector 1134 may receive the recovery information from the plurality of storage devices 1200_1 to 1200_n. The recovery collector 1134 may transfer the recovery information to the recovery sequence table generator 1135.

The recovery sequence table generator 1135 may generate the recovery sequence table RST. The recovery sequence table generator 1135 may generate the recovery sequence table RST based on the virtual machine group table VMGT, the storage attribute, and the recovery information. The recovery sequence table generator 1135 may determine the optimal recovery sequence based on the workload characteristic and the storage attribute. The recovery sequence table generator 1135 may determine the optimal recovery sequence by changing the order of the default recovery sequence. The default recovery sequence may refer to a given recovery sequence. The recovery sequence table generator 1135 may store, in the recovery sequence table RST, the optimal recovery sequence determined based on the workload characteristic and the storage attribute.

The recovery sequence (or a set of recovery operations) may refer to the order of recovery operations that the storage device performs when the read error occurs. The recovery sequence (or recovery operations) may be aligned in order from a highest priority to a lowest priority. The optimal recovery sequence may refer to a sequence of recovery operations capable of efficiently correcting a read error when the read error occurs. For example, the optimal recovery sequence may refer to a recovery sequence in which a time required to perform error correction is the shortest.

The recovery operation may refer to an operation of performing read error detection and read error correction when the read error occurs. The recovery operation may include a read retry operation, an operation of changing a read voltage level and performing a read operation, an operation of changing a read voltage level based on the number of program and/or erase cycles and performing a read operation, an operation of changing a read voltage level based on machine learning and performing a read operation, a soft decision or soft decoding operation, a hard decision or hard decoding operation, or the like.

In an embodiment, the recovery sequence table generator 1135 may align the recovery operations based on the recovery information. For example, the recovery sequence table generator 1135 may compare parameter values of the recovery operations based on the recovery information and may assign a higher priority to a recovery operation having a greater parameter value. That is, the recovery sequence table generator 1135 may determine orders of the recovery operations based on the parameter values. The parameter may include at least one of error correction success ratio, a latency, an error correction ratio, and power consumption. However, the present disclosure is not limited thereto.

For example, the error correction success ratio may refer to a ratio of the number of times that the recovery operation is performed and the number of times that an error is corrected. The recovery sequence table generator 1135 may determine the recovery operation that is performed the most to correct an error, based on the error correction success ratio. The latency may refer to a time taken to correct an error through the recovery operation. The recovery sequence table generator 1135 may determine the recovery operation requiring the shortest time, based on the latency. The error correction ratio may refer to a ratio of the total number of bits and the number of corrected bits. Alternatively, the error correction ratio may refer to a ratio of the number of error bits and the number of corrected bits. The recovery sequence table generator 1135 may determine the recovery operation correcting the most data, based on the error correction ratio.

For example, the recovery sequence table generator 1135 may assign a higher priority to the recovery operation in which the error correction success ratio is higher or the latency is shorter. The recovery sequence table generator 1135 may assign a lower priority to the recovery operation in which the error correction success ratio is lower or the latency is longer. That is, the recovery sequence table generator 1135 may place the recovery operation, in which the error correction success ratio is higher or the latency is shorter, at the front of the recovery sequence.

The recovery sequence allocator 1136 may provide the optimal recovery sequence to each of the plurality of storage devices 1200_1 to 1200_n. For example, the recovery sequence allocator 1136 may select the optimal recovery sequence for a storage device allocated to a new virtual machine, based on the recovery sequence table RST. The recovery sequence allocator 1136 may select the optimal recovery sequence from the recovery sequence table RST, based on the workload characteristic of the new virtual machine and the storage attribute of the storage device. The recovery sequence allocator 1136 may allocate the selected optimal recovery sequence to the storage device allocated to the new virtual machine. The storage device may minimize the reduction of performance by performing the recovery operation based on the optimal recovery sequence. Accordingly, the server system 1000 with improved performance is provided.

Figure 4:
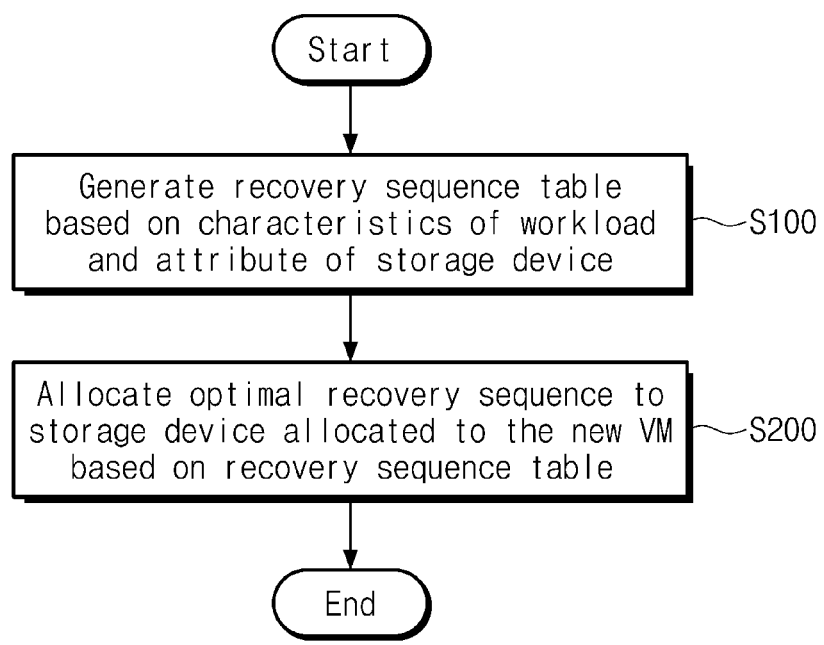
FIG. 4 is a flowchart illustrating an example of an operation of a storage server of FIG. 1.

FIG. 4 is a flowchart illustrating an example of an operation of a storage server of FIG. 1. Referring to FIGS. 1 and 4, in operation S100, the storage server 1002 may generate the recovery sequence table RST based on the workload characteristic and the attribute of the storage device. For example, the storage server 1002 may analyze the workload of the virtual machine (or a user, a client, or a container). The storage server 1002 may extract the workload characteristic of the virtual machine. For example, the workload characteristic may include at least one of read intensive, write intensive, a read ratio, a workload size, a work set size, cache status information (e.g., a hit rate), and a work flow. However, the present disclosure is not limited thereto.

The storage server 1002 may receive an attribute (or a characteristic, an indicator, or a metric) of a storage device allocated to a virtual machine from each of the plurality of storage devices 1200_1 to 1200_n. The attribute of the storage device (hereinafter referred to as a "storage attribute") may include at least one of a state of a nonvolatile memory, a type of the nonvolatile memory, a program manner (or type) (or the number of bits stored per memory cell) (e.g., a Single-Layer Cell (SLC), a Multi-Layer Cell (MLC), a Triple-Layer Cell (TLC), or a Quad-Layer Cell (QLC)), the number of programs-erase (PE) cycles, endurance/reliability, durability, an access frequency, or a life of the nonvolatile memory. However, the present disclosure is not limited thereto. The attribute information may refer to information about the storage attribute.

In operation S200, the storage server 1002 may allocate the optimal recovery sequence to a storage device allocated to a new virtual machine, based on the recovery sequence table RST. The optimal recovery sequence allocation method will be described in detail with reference to FIG. 9.

Figure 5:
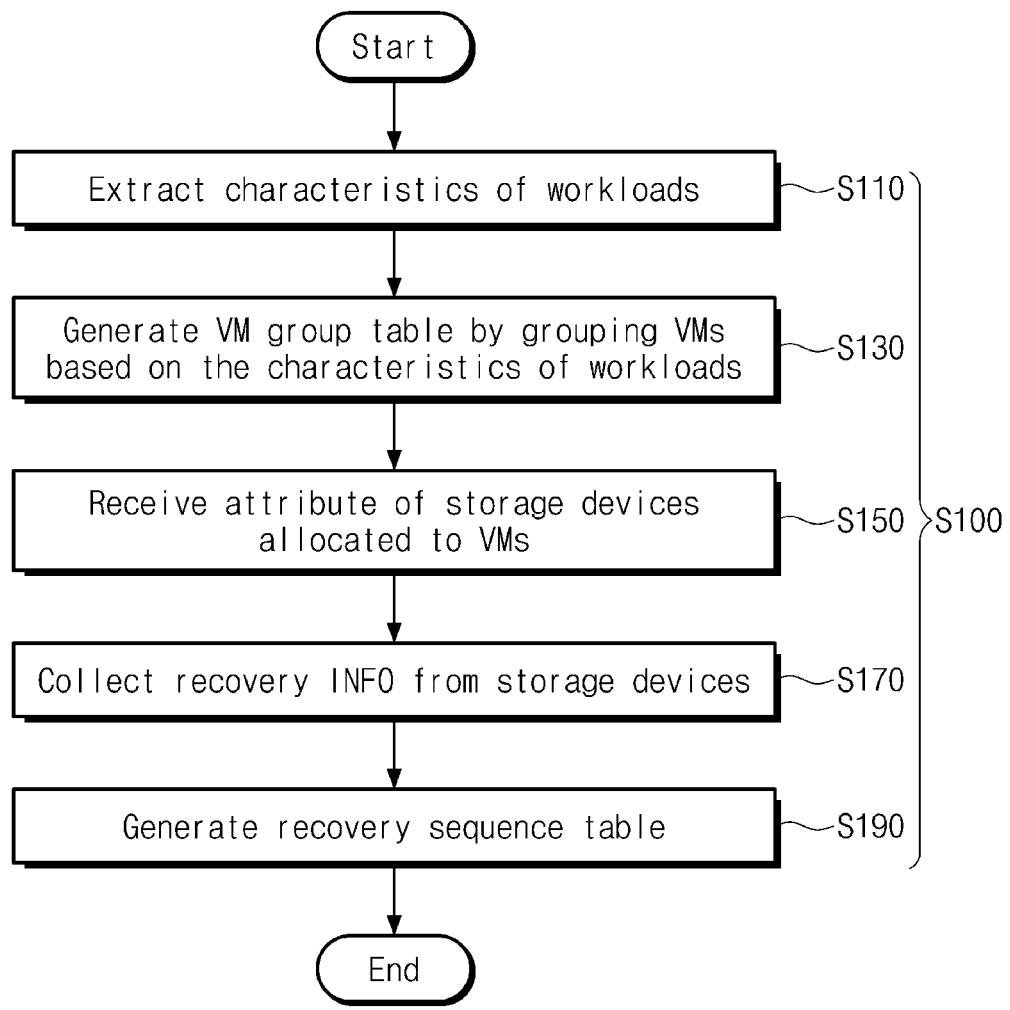
FIG. 5 is a flowchart illustrating operation S100 of FIG. 4 in detail.
Figure 6:
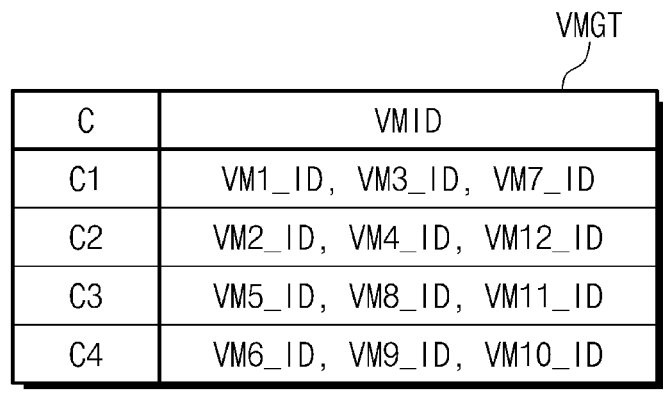
FIG. 6 is a diagram illustrating an example of a virtual machine group table.

FIG. 5 is a flowchart illustrating operation S100 of FIG. 4 in more detail. FIG. 6 is a diagram illustrating an example of a virtual machine group table. For convenience of description, it is assumed that first to twelfth virtual machines VM1 to VM12 are driven on the client server 1001 and data associated with the first to twelfth virtual machines VM1 to VM12 are stored in a corresponding storage device. In detail, it is assumed that the data associated with the first virtual machine VM1 are stored in the first storage device 1200_1, the data associated with the second virtual machine VM2 are stored in the second storage device 1200_2, the data associated with the third virtual machine VM3 are stored in the third storage device 1200_3, and the data associated with the fourth virtual machine VM4 are stored in the fourth storage device 1200_4. Data associated with the remaining virtual machines VM5 to VM12 are stored in a manner similar to those described above, and thus, additional description will be omitted to avoid redundancy.

Referring to FIGS. 1, 5, and 6, operation S100 may include operation S110 to operation S190. In operation S110, the storage server 1002 may extract characteristics of workloads of the virtual machines VM1 to VM12. For example, the storage server 1002 may monitor the user input/output I/O. The storage server 1002 may detect the user input/output I/O between the plurality of virtual machines VM1 to VM12 and corresponding storage devices. For example, the storage server 1002 may detect the read/write request and data that are exchanged between the first virtual machine VM1 and the first storage device 1200_1.

The storage server 1002 may analyze the user input/output I/O to extract a workload characteristic of a virtual machine. For example, the storage server 1002 may monitor the read/write request and data that are exchanged between the first virtual machine VM1 and the first storage device 1200_1. The storage server 1002 may analyze the read/write request and data that are exchanged between the first virtual machine VM1 and the first storage device 1200_1 and may determine whether the workload of the first virtual machine VM1 has the first workload characteristic C1 (e.g., the read intensive).

In operation S130, the storage server 1002 may group virtual machines based on the workload characteristics and may generate the virtual machine group table VMGT. In an embodiment, the storage server 1002 may classify virtual machines having similar workload characteristics as a group, based on the extracted workload characteristics.

Below, it is assumed that the workload characteristics of the virtual machines include first to fourth workload characteristics C1 to C4. That is, it is assumed that plurality of virtual machines are classified into four virtual machine groups according to the first to fourth workload characteristics C1 to C4. However, the present disclosure is not limited thereto. For example, the number of workload characteristics used for grouping or the number of virtual machine groups may increase or decrease depending on a way to implement.

Referring to FIG. 6, it is assumed that the first, third, and seventh virtual machines VM1, VM3, and VM7 have the first workload characteristic C1, the second, fourth, and twelfth virtual machines VM2, VM4, and VM12 have the second workload characteristic C2, the fifth, eighth, and eleventh virtual machines VM5, VM8, and VM11 have the third workload characteristic C3, and the sixth, ninth, and tenth virtual machines VM6, VM9, and VM10 have the fourth workload characteristic C4.

Because the first, third, and seventh virtual machines VM1, VM3, and VM7 have the first workload characteristic C1, the storage server 1002 may classify the first, third, and seventh virtual machines VM1, VM3, and VM7 as a first virtual machine group VMGroup1. Because the second, fourth, and twelfth virtual machines VM2, VM4, and VM12 have the second workload characteristic C2, the storage server 1002 may classify the second, fourth, and twelfth virtual machines VM2, VM4, and VM12 as a second virtual machine group VMGroup2. Because the fifth, eighth, and eleventh virtual machines VM5, VM8, and VM11 have the third workload characteristic C3, the storage server 1002 may classify the fifth, eighth, and eleventh virtual machines VM5, VM8, and VM11 as a third virtual machine group VMGroup3. Because the sixth, ninth, and tenth virtual machines VM6, VM9, and VM10 have the fourth workload characteristic C4, the storage server 1002 may classify the sixth, ninth, and tenth virtual machines VM6, VM9, and VM10 as a fourth virtual machine group VMGroup4.

The storage server 1002 may generate the virtual machine group table VMGT based on the grouping result. The storage server 1002 may store the virtual machine group table VMGT in the storage node memory 1120.

The virtual machine group table VMGT may include the workload characteristic and information about identifiers of virtual machines having the workload characteristic. For example, the virtual machine group table VMGT may include the first workload characteristic C1 and information on identifiers (i.e., first, third, and seventh virtual machine identifiers VM1_ID, VM3_ID, and VM7_ID) of virtual machines having the first workload characteristic C1, the second workload characteristic C2 and information on identifiers (i.e., second, fourth, and twelfth virtual machine identifiers VM2_ID, VM4_ID, and VM12_ID) of virtual machines having the second workload characteristic C2, the third workload characteristic C3 and information on identifiers (i.e., fifth, eighth, and eleventh virtual machine identifiers VM5_ID, VM8_ID, and VM11_ID) of virtual machines having the third workload characteristic C3, and the fourth workload characteristic C4 and information on identifiers (i.e., sixth, ninth, and tenth virtual machine identifiers VM6_ID, VM9_ID, and VM10_ID) of virtual machines having the fourth workload characteristic C4.

In operation S150, the storage server 1002 may receive information about attributes of storage devices allocated to virtual machines. For example, the storage node 1100 may send the attribute information request to each of the storage devices 1200_1 to 1200_12 corresponding to the virtual machines VM1 to VM12. The storage node 1100 may receive attribute information from each of the storage devices 1200_1 to 1200_12. The storage node 1100 may determine the storage attribute of each of the storage devices 1200_1 to 1200_12, based on the received attribute information.

In operation S170, the storage server 1002 may collect the recovery information (or recovery result) from storage devices. For example, the storage node 1100 may periodically (or repeatedly) request the recovery information from the storage devices 1200_1 to 1200_12. The storage node 1100 may receive the recovery information from the storage devices 1200_1 to 1200_12. The recovery information collection method will be described in detail with reference to FIG. 7.

In operation S190, the storage server 1002 may generate the recovery sequence table RST. For example, the storage node 1100 may generate the recovery sequence table RST based on the virtual machine group table VMGT, attributes of storage devices, and the recovery information. The storage node 1100 may store the recovery sequence table RST in the storage node memory 1120. The recovery sequence table RST will be described in detail with reference to FIGS. 8A and 8B.

Figure 7:
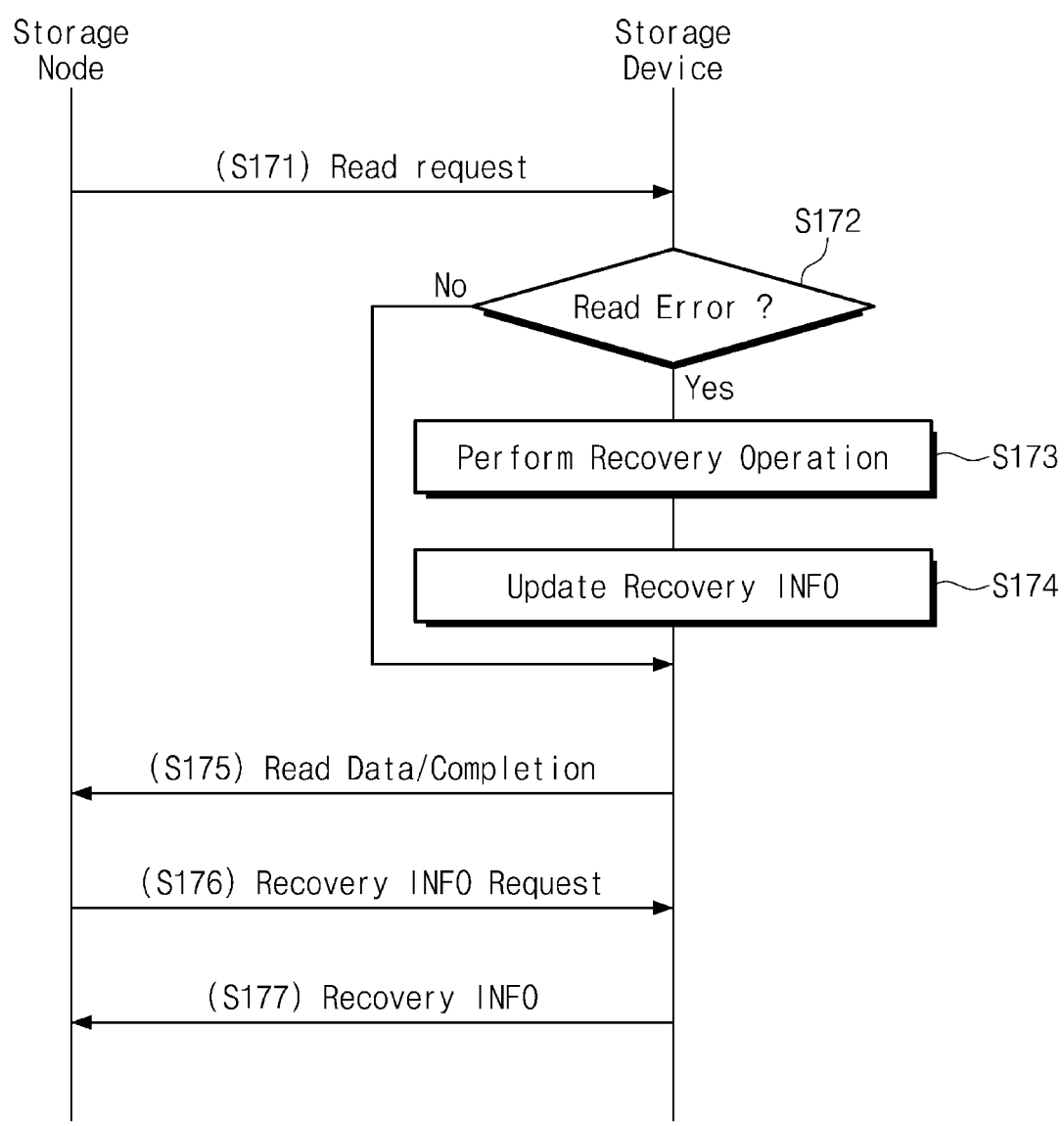
FIG. 7 is a flowchart illustrating operation S170 of FIG. 5 in detail.

FIG. 7 is a flowchart illustrating operation S170 of FIG. 5 in detail. For convenience of description, a method of receiving the recovery information of the first storage device 1200_1 where the data associated with the first virtual machine VM1 are stored will be described. Operation S170 may include operation S171 to operation S177. Referring to FIGS. 1, 5, and 7, in operation S171, the storage node 1100 may send the read request to the first storage device 1200_1. For example, the read request may include a logical block address LBA corresponding to data that the first virtual machine VM1 requires.

In operation S172, the first storage device 1200_1 may determine whether the read error occurs. For example, the first storage device 1200_1 may read data corresponding to the read request from the nonvolatile memory 1220 in response to the read request. The first storage device 1200_1 may determine whether the read error occurs at the data read from the nonvolatile memory 1220. When it is determined that the read error occurs, the first storage device 1200_1 performs operation S173. When it is determined that the read error does not occur, the first storage device 1200_1 performs operation S175.

In operation S173, the first storage device 1200_1 may perform the recovery operation. For example, the first storage device 1200_1 may perform the recovery operation based on the default recovery sequence.

In operation S174, the first storage device 1200_1 may update the recovery information. Alternatively, the first storage device 1200_1 may update a log page associated with the recovery information. For example, the recovery information may include information about execution content (or execution result or history) of the recovery operations of the recovery sequence. The recovery information may include a read error occurrence frequency, an identifier of a recovery operation performed from among recovery operations of the recovery sequence, an identifier of a recovery operation, in which a read error is corrected, from among the recovery operations of the recovery sequence, an error correction success ratio of the recovery operations, latencies of the recovery operations, an error correction ratio of the recovery operations, power consumption of the recovery operations, and the like. For example, the first storage device 1200_1 may update the read error occurrence frequency and may store an identifier of a recovery operation where the read error is corrected, as the recovery information.

In operation S175, the first storage device 1200_1 may send the read data and a completion entry corresponding to the read request to the storage node 1100. The first storage device 1200_1 may send the error-corrected read data to the storage node 1100.

In operation S176, the storage node 1100 may send a recovery information request to the first storage device 1200_1. For example, the storage node 1100 may send a "Get Log Page" command including a log identifier corresponding to the recovery information to the first storage device 1200_1.

In operation S177, the first storage device 1200_1 may send the recovery information to the storage node 1100 in response to the recovery information request. For example, the first storage device 1200_1 may send a "Get Log Page" completion and log data including the recovery information to the storage node 1100 in response to the "Get Log Page" command.

In an embodiment, the storage node 1100 may send the recovery information request to the storage node 1100 and receive the recovery information from the storage node 1100 periodically or repeatedly. For example, the storage server 1002 may repeatedly perform operation S170. The storage server 1002 may repeatedly perform the recovery information collection operation during a given time period.

In an embodiment, the storage server 1002 may perform operation S171 to operation S175 repeatedly. After collecting recovery information plural times, the first storage device 1200_1 may send the collected recovery information to the storage node 1100 in response to the recovery information request. In other words, after repeatedly performing the read operation (i.e., operation S171 to operation S175), the storage node 1100 may request the accumulated recovery information from the first storage device 1200_1.

FIGS. 8A and 8B are diagrams illustrating examples of a recovery sequence table according to an example embodiment of the present disclosure. Referring to FIG. 8A, the recovery sequence table RST may include a plurality of tables RT1 to RT4. The first recovery table RT1 is a table associated with the first virtual machine group VMGroup1 having the first workload characteristic C1, the second recovery table RT2 is a table associated with the second virtual machine group VMGroup2 having the second workload characteristic C2, the third recovery table RT3 is a table associated with the third virtual machine group VMGroup3 having the third workload characteristic C3, and the fourth recovery table RT4 is a table associated with the fourth virtual machine group VMGroup4 having the fourth workload characteristic C4.

For convenience of description, below, it is assumed that storage attributes of the storage devices 1200_1 to 1200_12 include a first storage attribute A1 and a second storage attribute A2. However, the present disclosure is not limited thereto. For example, the number of storage attributes of the storage devices 1200_1 to 1200_12 may increase or decrease depending on an embodiment. For example, each of the storage devices 1200_1 to 1200_12 may have one of the first storage attribute A1 and the second storage attribute A2. It is assumed that the first to sixth storage devices 1200_1 to 1200_6 have the first storage attribute A1 and the seventh to twelfth storage devices 1200_7 to 1200_12 have the second storage attribute A2.

The first recovery table RT1 may include information (e.g., a first recovery sequence) about the optimal recovery sequence for the first storage attribute A1 with respect to virtual machines having the first workload characteristic C1 and may include information (e.g., the second recovery sequence) about the optimal recovery sequence for the second storage attribute A2 with respect to virtual machines having the first workload characteristic C1. For example, there are four recovery operations and the first recovery sequence may refer to a sequence that is set (or aligned) to perform a fourth recovery operation, then performs a third recovery operation, then performs a first recovery operation, and then performs a second recovery operation. The second recovery sequence may include a recovery sequence that is set to perform the second recovery operation, then performs the third recovery operation, then performs the first recovery operation, and then performs the fourth recovery operation.

The second recovery table RT2 may include information (e.g., a third recovery sequence) about the optimal recovery sequence for the first storage attribute A1 with respect to virtual machines having the second workload characteristic C2 and may include information (e.g., a fourth recovery sequence) about the optimal recovery sequence for the second storage attribute A2 with respect to virtual machines having the second workload characteristic C2. The third recovery sequence may include a sequence that is set to perform the first recovery operation, then performs the second recovery operation, then performs the third recovery operation, and then performs the fourth recovery operation. The fourth recovery sequence may include a sequence that is set to perform the fourth recovery operation, then performs the third recovery operation, then performs the second recovery operation, and then performs the first recovery operation.

The third recovery table RT3 may include information (e.g., a fifth recovery sequence) about the optimal recovery sequence for the first storage attribute A1 with respect to virtual machines having the third workload characteristic C3 and may include information (i.e., a sixth recovery sequence) about the optimal recovery sequence for the second storage attribute A2 with respect to virtual machines having the third workload characteristic C3. The fifth recovery sequence may refer to a sequence that is set to perform the third recovery operation, then performs the fourth recovery operation, then performs the first recovery operation, and then performs the second recovery operation. The sixth recovery sequence includes a sequence that is set to perform the first recovery operation, then performs the fourth recovery operation, then performs the third recovery operation, and then performs the second recovery operation.

The fourth recovery table RT4 may include information (e.g., a seventh recovery sequence) about the optimal recovery sequence for the first storage attribute A1 with respect to virtual machines having the fourth workload characteristic C4 and may include information (e.g., an eighth recovery sequence) about the optimal recovery sequence for the second storage attribute A2 with respect to virtual machines having the fourth workload characteristic C4. The seventh recovery sequence may include a sequence that is set to perform the second recovery operation, then performs the first recovery operation, then performs the third recovery operation, and then performs the fourth recovery operation.

The eighth recovery sequence may include a sequence that is set to perform the third recovery operation, then performs the first recovery operation, then performs the second recovery operation, and then performs the fourth recovery operation.

For example, referring to FIG. 6, the first virtual machine group VMGroup1 may include the first, third, and seventh virtual machines VM1, VM3, and VM7. The data associated with the first virtual machine VM1 may be stored in the first storage device 1200_1, the data associated with the third virtual machine VM3 may be stored in the third storage device 1200_3, and the data associated with the seventh virtual machine VM7 may be stored in the seventh storage device 1200_7. The first and third storage devices 1200_1 and 1200_3 may have the first storage attribute A1, and the seventh storage device 1200_7 may have the second storage attribute A2.

The storage node 1100 may select the optimal recovery sequence (i.e., the first recovery sequence) based on the recovery information received from the first and third storage devices 1200_1 and 1200_3. The storage node 1100 may select the optimal recovery sequence (i.e., the second recovery sequence) based on the recovery information received from the seventh storage device 1200_7. The remaining recovery sequences (i.e., the third to eighth recovery sequences) are selected in a manner similar to those described above, and thus, additional description will be omitted to avoid redundancy.

FIG. 8A shows the recovery sequence table RST that stores one optimal recovery sequence with regard to the workload characteristic and the storage attribute. In contrast, FIG. 8B shows that the recovery sequence table RST may store a plurality of optimal recovery sequences with regard to the workload characteristic and the storage attribute. For brevity of drawing, FIG. 8B shows only the first recovery table RT1.

The first recovery table RT1 includes recovery sequences associated with the first virtual machine group VMGroup1 having the first workload characteristic C1. The first recovery table RT1 includes first to third entries with regard to the first storage attribute A1. For example, the first entry includes a recovery sequence that is set (or aligned) to perform the fourth recovery operation, then performs the third recovery operation, then performs the first recovery operation, and then performs the second recovery operation. The second entry includes a recovery sequence that is set to perform the fourth recovery operation, then performs the third recovery operation, then performs the second recovery operation, and then performs the first recovery operation. The third entry includes a recovery sequence that is set to perform the fourth recovery operation, then performs the first recovery operation, then performs the third recovery operation, and then performs the second recovery operation.

The first recovery table RT1 further includes fourth to sixth entries with regard to the second storage attribute A2. For example, the fourth entry includes a recovery sequence that is set to perform the second recovery operation, then performs the third recovery operation, then performs the first recovery operation, and then performs the fourth recovery operation. The fifth entry includes a recovery sequence that is set to perform the second recovery operation, then performs the third recovery operation, then performs the fourth recovery operation, and then performs the first recovery operation. The sixth entry includes a recovery sequence that is set to perform the second recovery operation, then performs the first recovery operation, then performs the third recovery operation, and then performs the fourth recovery operation.

The storage node 1100 may provide the optimal recovery sequence corresponding to one of the first to third entries to a storage device having the first storage attribute A1 from among storage devices corresponding to the first virtual machine group VMGroup1. The storage node 1100 may select one of a plurality of optimal recovery sequences based on other storage attributes or other factors and may provide the selected optimal recovery sequence to the storage device. Alternatively, when the error occurrence frequency is high in the previously provided optimal recovery sequence (e.g., the recovery sequence corresponding to the first entry), the storage node 1100 may provide the optimal recovery sequence corresponding to the second entry to the storage device.

Figure 9:
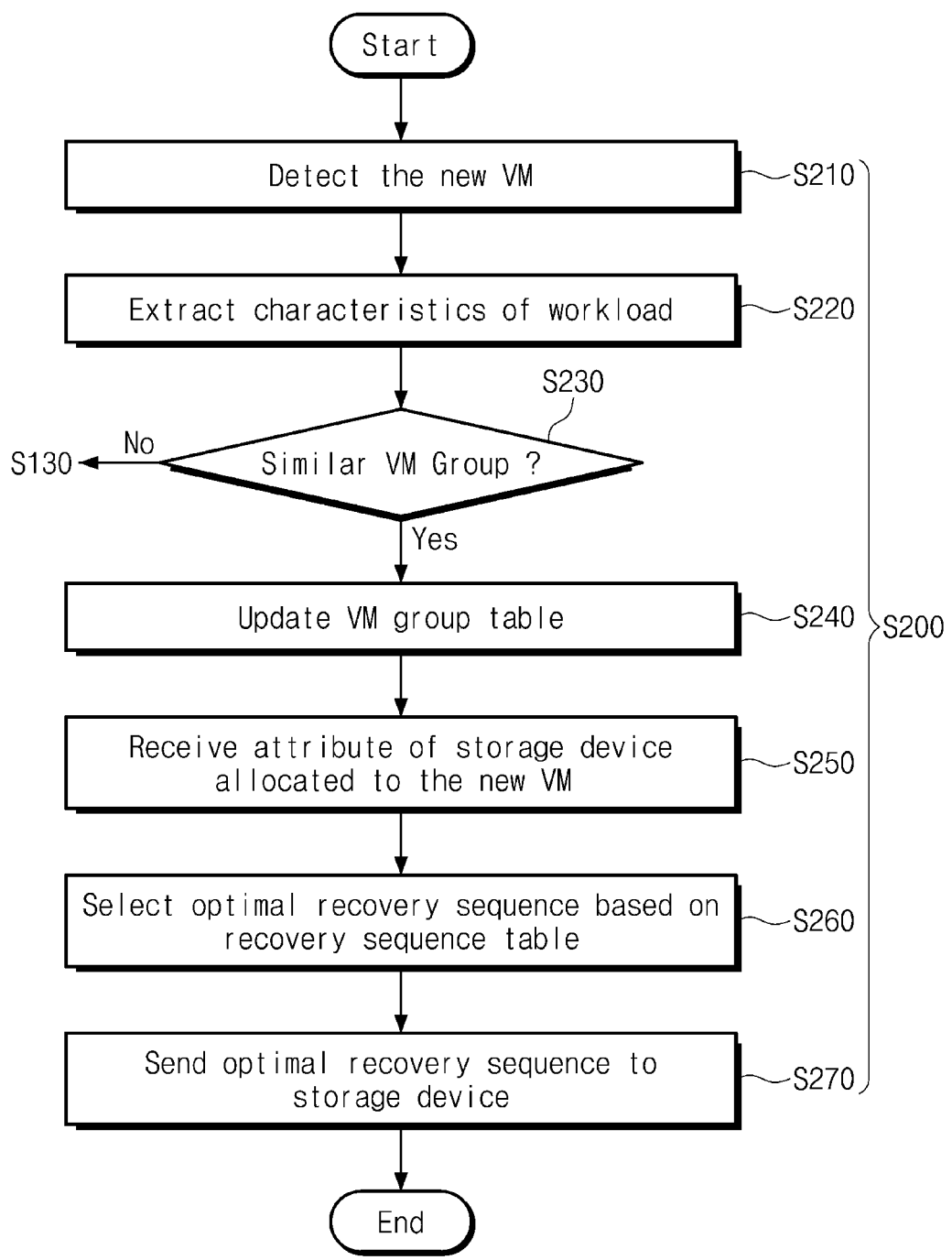
FIG. 9 is a flowchart illustrating operation S200 of FIG. 4 in detail.

FIG. 9 is a flowchart illustrating operation S200 of FIG. 4 in more detail. Referring to FIGS. 1, 4, and 9, operation S200 may include operation S210 to operation S270. In operation S210, the storage server 1002 may detect a new virtual machine. For example, the storage server 1002 may detect the user input/output from the new virtual machine.

In operation S220, the storage server 1002 may extract a workload characteristic of the new virtual machine. For example, the storage node 1100 masy monitor the read/write request and the data that are exchanged between the new virtual machine and a storage device allocated to the new virtual machine. The storage node 1100 may analyze the read/write request and the data exchanged between the new virtual machine and the corresponding storage device and may determine the workload characteristic of the new virtual machine.

In operation S230, the storage server 1002 may determine whether there is a group of virtual machines similar in characteristic to the new virtual machine. For example, whether the workload of the new virtual machine has one of the first to fourth workload characteristics C1 to C4 may be determined. When it is determined that there is a group of virtual machines similar in characteristic to the new virtual machine, the storage server 1002 performs operation S240 to operation S270. When it is determined that there is no group of virtual machines similar in characteristic to the new virtual machine, the storage server 1002 performs operation S130 of FIG. 5.

For example, when there is no group of virtual machines similar in characteristic to the new virtual machine (that is, the method proceeds to operation S130), the storage server 1002 may update the virtual machine group table VMGT. The storage server 1002 may add a new workload characteristic (e.g., a fifth workload characteristic) and an identifier of the new virtual machine to the virtual machine group table VMGT. The storage server 1002 may receive the attribute of the storage device corresponding to the new virtual machine. The storage server 1002 may receive the recovery information of the storage device corresponding to the new virtual machine. The storage server 1002 may update the recovery sequence table RST based on the recovery information. The storage server 1002 may select the optimal recovery sequence of the storage device corresponding to the new virtual machine, based on the recovery information. The storage server 1002 may generate a fifth recovery table with regard to the fifth workload characteristic. The storage server 1002 may add the fifth recovery table to the recovery sequence table RST. The fifth recovery table may include the optimal recovery sequence that is selected in consideration of the storage attribute. Alternatively, in an embodiment, the storage server 1002 may include the new virtual machine in a group of virtual machines having the most similar characteristic by using the clustering technique.

In operation S240, the storage server 1002 may update the virtual machine group table VMGT. For example, the storage server 1002 may add the identifier of the new virtual machine to an identifier of a virtual machine corresponding to the workload characteristic, which is the same or similar to the workload characteristic of the new virtual machine, in the virtual machine group table VMGT.

In operation S250, the storage server 1002 may receive attribute information of the storage device from the storage device allocated to new virtual machine. In operation S260, the storage server 1002 may select the optimal recovery sequence based on the recovery sequence table RST. The storage server 1002 may select the optimal recovery sequence with reference to the recovery sequence table RST, that is, based on the workload characteristic of the new virtual machine and the storage attribute of the storage device allocated to the new virtual machine.

In operation S270, the storage server 1002 may provide the optimal recovery sequence to the storage device. For example, the storage server 1002 may allocate the selected optimal recovery sequence to the storage device allocated to the new virtual machine.

Figure 10A:
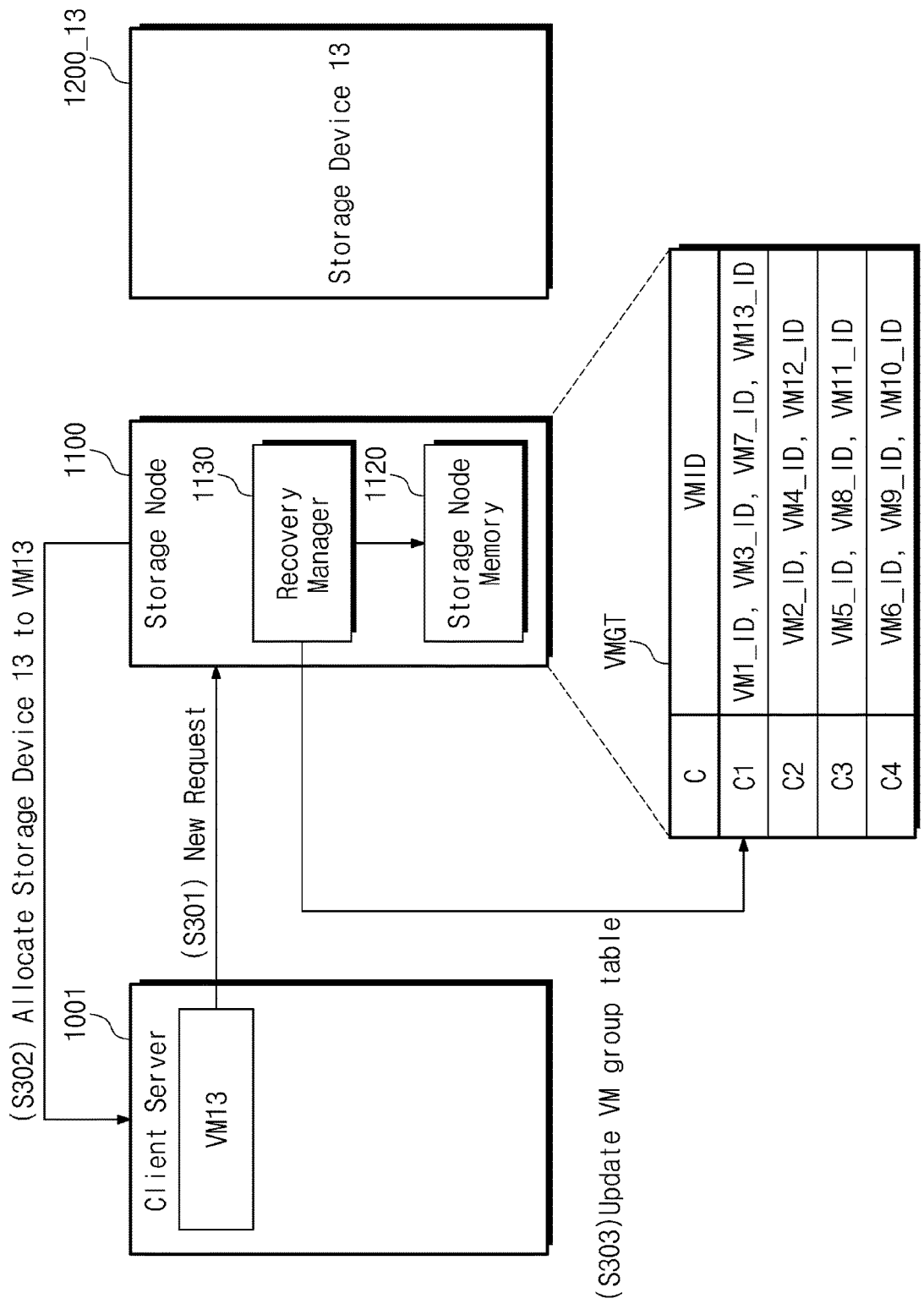
Figure 10B:
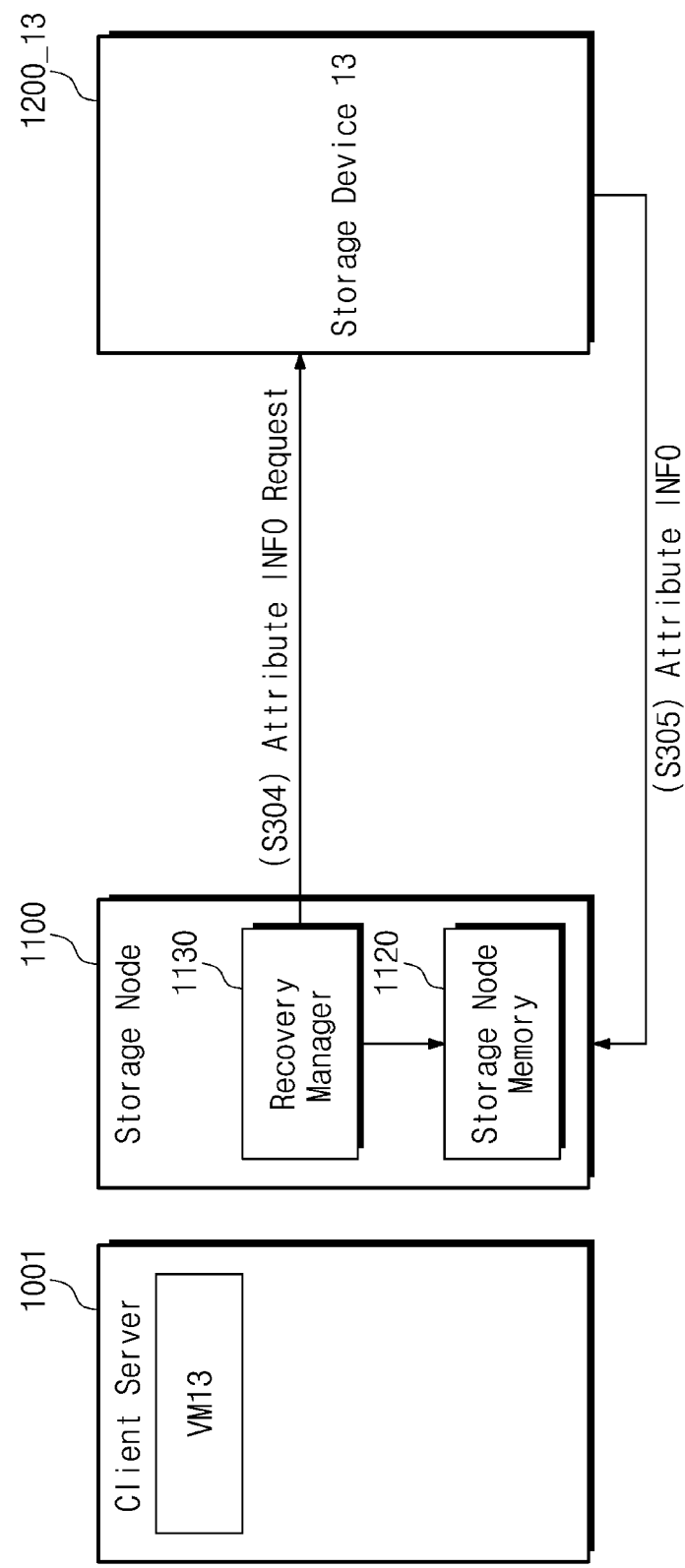

FIGS. 10A to 10C are diagrams illustrating examples of an operation of a server system of FIG. 1. A method of allocating an optimal recovery sequence based on a recovery sequence table will be described with reference to FIGS. 10A to 10C. Below, for brevity of drawing and for convenience of description, additional description associated with components the same as or similar to the above components will be omitted to avoid redundancy. It is assumed that a new virtual machine (i.e., a thirteenth virtual machine VM13) is driven on the client server 1001.

In operation S301, the thirteenth virtual machine VM13 may send a new request to the storage node 1100. In operation S302, the storage node 1100 may allocate a thirteenth storage device 1200_13 to the thirteenth virtual machine VM13. For example, the storage node 1100 may store data associated with the thirteenth virtual machine VM13 in the thirteenth storage device 1200_13. The storage node 1100 may allocate the default recovery sequence to the thirteenth storage device 1200_13. When the read error occurs, the thirteenth storage device 1200_13 may perform the recovery operations based on the default recovery sequence.

The storage node 1100 may detect the user input/output I/O associated with the thirteenth virtual machine VM13. The storage node 1100 may monitor the read/write request and the data that are exchanged between the thirteenth virtual machine VM13 and the thirteenth storage device 1200_13. The storage node 1100 may analyze the read/write request and the data exchanged the thirteenth virtual machine VM13 and the thirteenth storage device 1200_13 and may determine the workload characteristic of the thirteenth storage device 1200_13. For example, the storage node 1100 may determine whether the thirteenth virtual machine VM13 has the first workload characteristic C1. The storage node 1100 may determine that the thirteenth virtual machine VM13 is similar to the first virtual machine group VMGroup1 with regards to the workload characteristic. The storage node 1100 may determine that the thirteenth virtual machine VM13 belongs to the first virtual machine group VMGroup1.

In operation S303, the recovery manager 1130 may update the virtual machine group table VMGT. Because the thirteenth virtual machine VM13 has the first workload characteristic C1, the recovery manager 1130 may update the virtual machine group table VMGT such that information about identifiers (i.e., the first, third, seventh, and thirteenth virtual machine identifiers VM1_ID, VM3_ID, VM7_ID, and VM13_ID) of virtual machines having the first workload characteristic C1 is included therein. That is, the recovery manager 1130 may add the thirteenth virtual machine identifier VM13_ID to the information about the identifiers of the virtual machines having the first workload characteristic C1. As such, the virtual machine group table VMGT may include the first workload characteristic C1 and the information about the identifiers (i.e., the first, third, seventh, and thirteenth virtual machine identifiers VM1_ID, VM3_ID, VM7_ID, and VM13_ID) of the virtual machines having the first workload characteristic C1.

Referring to FIG. 10B, in operation S304, the storage node 1100 may send the attribute information request to the thirteenth storage device 1200_13. For example, the storage node 1100 may send the "Get Log Page" command including a log identifier. For example, the log identifier may correspond to SMART and/or Health Information. Alternatively, the storage node 1100 may send a "Get Feature" command. Alternatively, the storage node 1100 may send a telemetry information request.

In operation S305, the storage node 1100 may receive the attribute information from the thirteenth storage device 1200_13. The thirteenth storage device 1200_13 may send the storage attribute information to the storage node 1100 in response to the attribute information request. For example, the thirteenth storage device 1200_13 may send the attribute information including the first storage attribute A1 to the storage node 1100. The storage node 1100 may determine that the thirteenth storage device 1200_13 has the first storage attribute A1, based on the received attribute information.

Alternatively, in an embodiment, the storage node 1100 may receive telemetry information from the thirteenth storage device 1200_13. The thirteenth storage device 1200_13 may send the telemetry information to the storage node 1100 in response to the telemetry information request. The storage node 1100 may determine the attribute of the thirteenth storage device 1200_13 based on the received telemetry information.

Referring to FIG. 10C, the storage node 1100 may select the optimal recovery sequence of the thirteenth storage device 1200_13. The storage node 1100 may select the optimal recovery sequence based on the recovery sequence table RST. Because the thirteenth virtual machine VM13 has the first workload characteristic C1, the storage node 1100 may refer to the first recovery table RT1. Because the thirteenth storage device 1200_13 has the first storage attribute A1, the storage node 1100 may select the recovery sequence corresponding to the first storage attribute A1 from the first recovery table RT1. That is, the storage node 1100 may select information about the optimal recovery sequence for the first storage attribute A1 (i.e., information about the first recovery sequence being the sequence having the order of the fourth recovery operation ROP4, the third recovery operation ROP3, the first recovery operation ROP1, and the second recovery operation ROP2).

In operation S306, the storage node 1100 may provide the thirteenth storage device 1200_13 with the optimal recovery sequence including the first recovery sequence (i.e., the sequence having the order of the fourth recovery operation ROP4, the third recovery operation ROP3, the first recovery operation ROP1, and the second recovery operation ROP2).

For example, the storage node 1100 may send the "Set Feature" command including the first recovery sequence. Alternatively, the storage node 1100 may allocate the first recovery sequence being the optimal recovery sequence through a "Vendor" command including the first recovery sequence.

The thirteenth storage device 1200_13 may receive the optimal recovery sequence including the first recovery sequence. When the read error occurs, the thirteenth storage device 1200_13 may perform the recovery operations based on the optimal recovery sequence.

For example, when the read error occurs, the thirteenth storage device 1200_13 may preferentially perform the fourth recovery operation ROP4. When the read error is corrected through the fourth recovery operation ROP4, the thirteenth storage device 1200_13 may not perform the remaining recovery operations (i.e., the third recovery operation ROP3, the first recovery operation ROP1, and the second recovery operation ROP2). When the read error is not corrected through the fourth recovery operation ROP4, the thirteenth storage device 1200_13 may perform the third recovery operation ROP3. When the read error is corrected through the third recovery operation ROP3, the thirteenth storage device 1200_13 may not perform the remaining recovery operations (i.e., the first recovery operation ROP1 and the second recovery operation ROP2). When the read error is not corrected through the third recovery operation ROP3, the thirteenth storage device 1200_13 may perform the first recovery operation ROP1. When the read error is corrected through the first recovery operation ROP1, the thirteenth storage device 1200_13 may not perform the remaining recovery operation (i.e., the second recovery operation ROP2). When the read error is not corrected through the first recovery operation ROP1, the thirteenth storage device 1200_13 may perform the second recovery operation ROP2.

Figure 11:
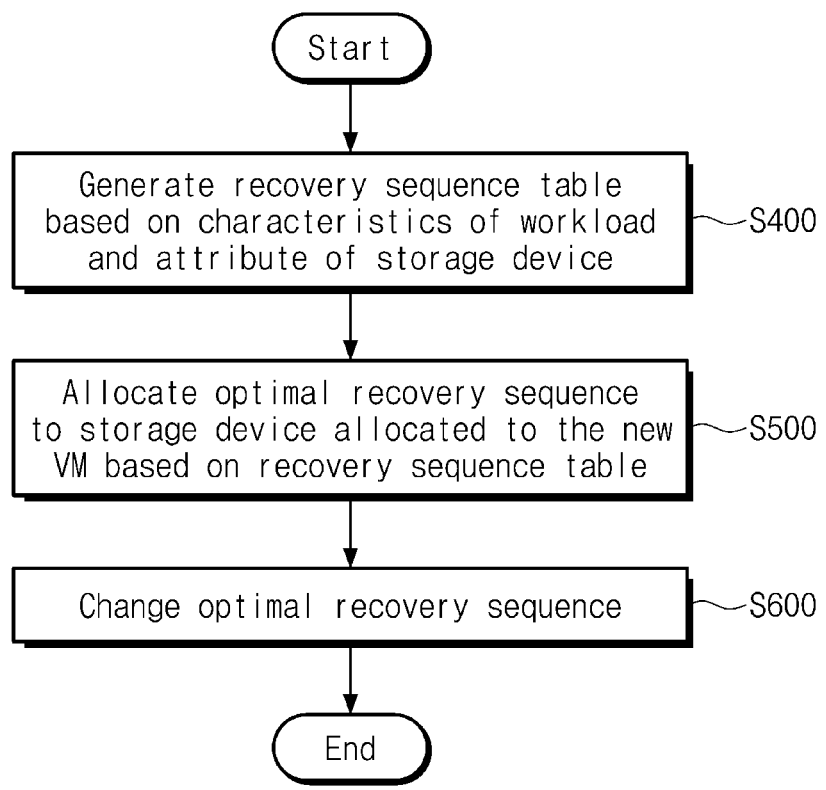
FIG. 11 is a flowchart illustrating an example of an operation of a storage server of FIG. 1.

FIG. 11 is a flowchart illustrating an example of an operation of a storage server of FIG. 1. Referring to FIGS. 1, 4, and 11, in operation S400, the storage server 1002 may generate the recovery sequence table RST based on the workload characteristic and the attribute of the storage device. In operation S500, the storage server 1002 may allocate the optimal recovery sequence to a storage device to be allocated to a new virtual machine, based on the recovery sequence table RST. Operation S400 and operation S500 are similar to operation S100 and operation S200 of FIG. 4, and thus, additional description will be omitted to avoid redundancy.

In operation S600, the storage server 1002 may change the optimal recovery sequence. For example, the storage attribute of the first storage device 1200_1 may change over time. As such, the storage server 1002 may change the optimal recovery sequence of the first storage device 1200_1.

Figure 12:
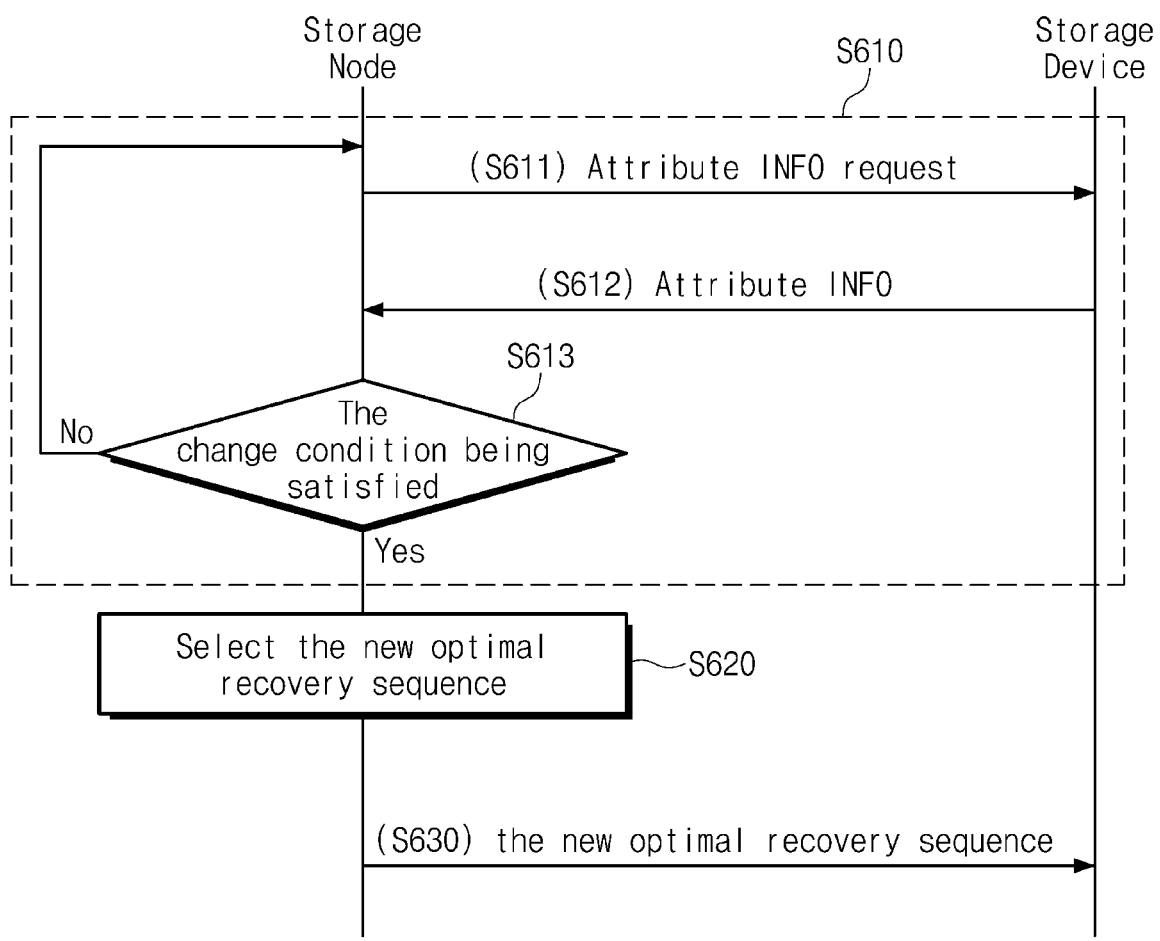
FIG. 12 is a flowchart illustrating operation S600 of FIG. 11 in detail.

FIG. 12 is a flowchart illustrating operation S600 of FIG. 11 in detail. In FIG. 12, it is assumed that a storage device is the thirteenth storage device 1200_13 among the plurality of storage devices 1200_1 to 1200_n. However, the present disclosure is not limited thereto. For example, the remaining storage devices may operate to be similar thereto.

Referring to FIGS. 1, 11, and 12, in operation S610, the storage node 1100 may repeatedly perform the monitoring operation for the thirteenth storage device 1200_13. For example, the storage node 1100 may monitor the storage attribute of the thirteenth storage device 1200_13.

In detail, operation S610 may include operation S611 to operation S613. In operation S611, the storage node 1100 may send the attribute information request to the thirteenth storage device 1200_13. For example, the attribute information request may include the "Get Log Page" command including the log identifier. For example, the log identifier may correspond to the SMART and/or Health Information. Alternatively, the storage node 1100 may send the "Get Feature" command. Alternatively, the storage node 1100 may send the telemetry information request.

In operation S612, the thirteenth storage device 1200_13 may send the attribute information to the storage node 1100. For example, the thirteenth storage device 1200_13 may send the changed attribute information to the storage node 1100 in response to the attribute information request. Alternatively, the thirteenth storage device 1200_13 may send the changed telemetry information to the storage node 1100 in response to the telemetry information request.

In operation S613, the storage node 1100 may determine whether the change condition is satisfied. For example, when the storage attribute (or characteristic) of the thirteenth storage device 1200_13 changes, when the monitored numerical value reaches a threshold value, or when the read error frequency increases, the change condition may be satisfied. When the change condition is satisfied, the storage node 1100 performs operation S620. When the change condition is not satisfied, the storage node 1100 performs operation S611.

For example, based on the received attribute information (or telemetry information), the storage node 1100 may determine that a storage attribute of the thirteenth storage device 1200_13 changes from the first storage attribute A1 to the second storage attribute A2. As such, the storage node 1100 may determine that the change condition for the recovery sequence of the thirteenth storage device 1200_13 is satisfied.

In operation S620, the storage node 1100 may select a new optimal recovery sequence. For example, referring to FIG. 10C, because the thirteenth storage device 1200_13 has the second storage attribute A2, the storage node 1100 may select the recovery sequence corresponding to the second storage attribute A2 from the first recovery table RT1. That is, the storage node 1100 may select information about the optimal recovery sequence for the second storage attribute A2 (i.e., information about the second recovery sequence being the sequence having the order of the second recovery operation ROP2, the third recovery operation ROP3, the first recovery operation ROP1, and the fourth recovery operation ROP4).

In operation S630, the storage node 1100 may send the new optimal recovery sequence to the thirteenth storage device 1200_13. For example, the storage node 1100 may provide the thirteenth storage device 1200_13 with the optimal recovery sequence including the second recovery sequence (i.e., the sequence having the order of the second recovery operation ROP2, the third recovery operation ROP3, the first recovery operation ROP1, and the fourth recovery operation ROP4).

Figure 13A:
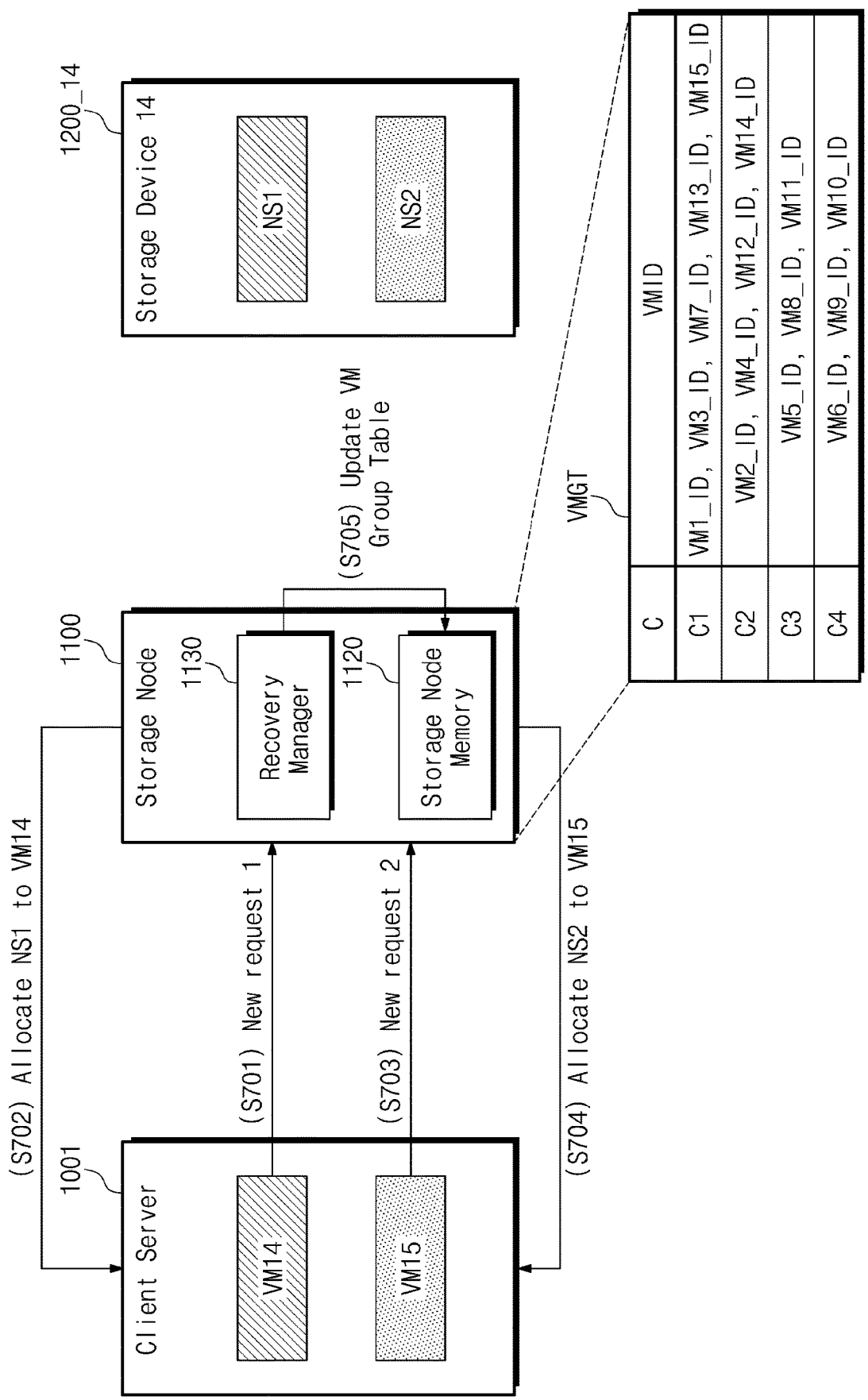
FIGS. 13A to 13C are diagrams illustrating examples of an operation of a server system of FIG. 1.
Figure 13B:
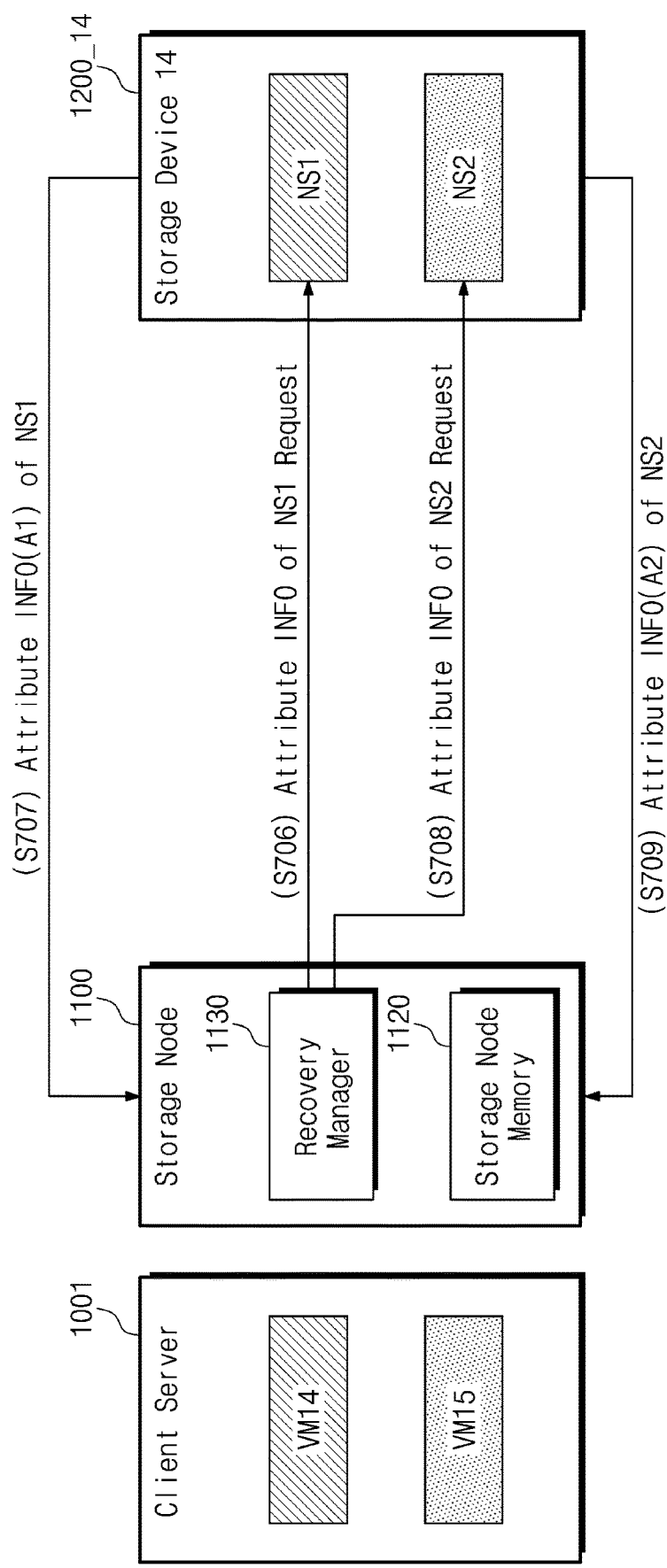
Figure 13C:
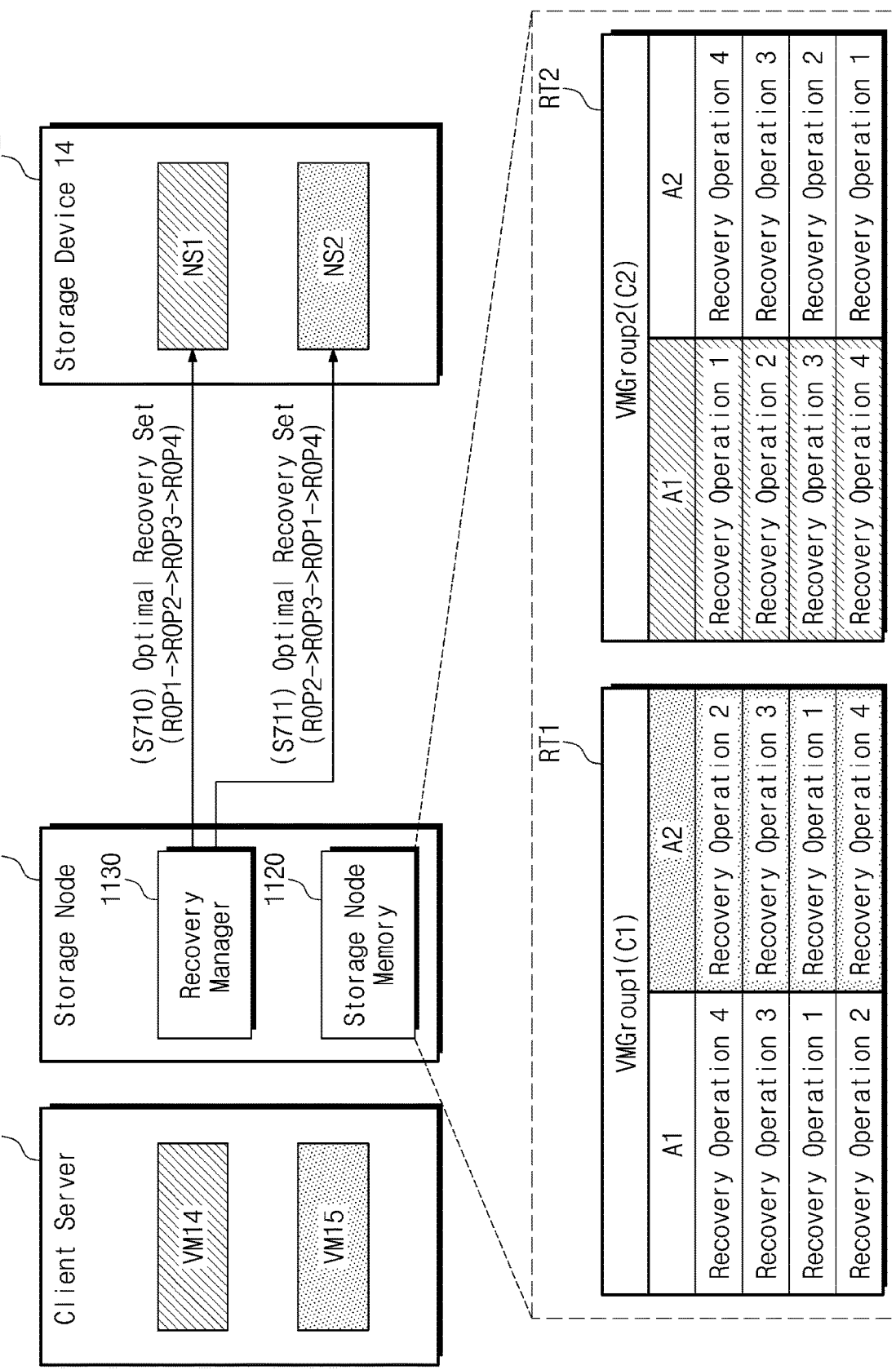

FIGS. 13A to 13C are diagrams illustrating examples of an operation of a server system of FIG. 1. The method in which the storage node 1100 transfers one optimal recovery sequence to each of the plurality of storage devices 1200_1 to 1200_n has been described with reference to FIGS. 1 to 12. The method in which the storage node 1100 transfers a plurality of optimal recovery sequences to each of the plurality of storage devices 1200_1 to 1200_n is described with reference to FIGS. 13A to 13C. It is assumed that new virtual machines (i.e., fourteenth and fifteenth virtual machines VM14 and VM15) are driven on the client server 1001.

In operation S701, the fourteenth virtual machine VM14 may send a first new request to the storage node 1100. In operation S702, the storage node 1100 may allocate a first namespace NS1 of the fourteenth storage device 1200_14 to the fourteenth virtual machine VM14. For example, the storage node 1100 may store data associated with the fourteenth virtual machine VM14 in the first namespace NS1 of the fourteenth storage device 1200_14.

In operation S703, the fifteenth virtual machine VM15 may send a second new request to the storage node 1100. In operation S704, the storage node 1100 may allocate a second namespace NS2 of the fourteenth storage device 1200_14 to the fifteenth virtual machine VM15. For example, the storage node 1100 may store data associated with the fifteenth virtual machine VM15 in the second namespace NS2 of the fourteenth storage device 1200_14.

The storage node 1100 may detect the user input/output I/O associated with the fourteenth virtual machine VM14. The storage node 1100 may monitor the read/write request and the data that are exchanged between the fourteenth virtual machine VM14 and the first namespace NS1 of the fourteenth storage device 1200_14. The storage node 1100 may analyze the read/write request and the data exchanged the fourteenth virtual machine VM14 and the first namespace NS1 of the fourteenth storage device 1200_14 and may determine the workload characteristic of the fourteenth virtual machine VM14. For example, the storage node 1100 may determine whether the fourteenth virtual machine VM14 has the second workload characteristic C2.

The storage node 1100 may detect the user input/output I/O associated with the fifteenth virtual machine VM15. The storage node 1100 may monitor the read/write request and the data that are exchanged between the fifteenth virtual machine VM15 and the second namespace NS2 of the fourteenth storage device 1200_14. The storage node 1100 may analyze the read/write request and the data exchanged the fifteenth virtual machine VM15 and the second namespace NS2 of the fourteenth storage device 1200_14 and may determine the workload characteristic of the fifteenth virtual machine VM15. For example, the storage node 1100 may determine whether the fifteenth virtual machine VM15 has the first workload characteristic C1.

In operation S705, the recovery manager 1130 may update the virtual machine group table VMGT. For example, because the fourteenth virtual machine VM14 has the second workload characteristic C2, the recovery manager 1130 may update the virtual machine group table VMGT such that information about identifiers (i.e., the second, fourth, twelfth, and fourteenth virtual machine identifiers VM2_ID, VM4_ID, VM12_ID, and VM14 ID) of virtual machines having the second workload characteristic C2 is included therein. That is, the recovery manager 1130 may add the fourteenth virtual machine identifier VM14 ID to the information about the identifiers of the virtual machines having the second workload characteristic C2. As such, the virtual machine group table VMGT may include the second workload characteristic C2 and the information about the identifiers (i.e., the second, fourth, twelfth, and fourteenth virtual machine identifiers VM2_ID, VM4_ID, VM12_ID, and VM14 ID) of the virtual machines having the second workload characteristic C2.

For example, because the fifteenth virtual machine VM15 has the first workload characteristic C1, the recovery manager 1130 may update the virtual machine group table VMGT such that information about identifiers (i.e., the first, third, seventh, thirteenth, and fifteenth virtual machine identifiers VM1_ID, VM3_ID, VM7_ID, VM13_ID, and VM15 ID) of virtual machines having the first workload characteristic C1 is included therein. That is, the recovery manager 1130 may add the fifteenth virtual machine identifier VM15 ID to the information about the identifiers of the virtual machines having the first workload characteristic C1. As such, the virtual machine group table VMGT may include the first workload characteristic C1 and the information about the identifiers (i.e., the first, third, seventh, thirteenth, and fifteenth virtual machine identifiers VM1_ID, VM3_ID, VM7_ID, VM13_ID, and VM15 ID) of the virtual machines having the first workload characteristic C1.

Referring to FIG. 13B, in operation S706, the storage node 1100 may send the attribute information request to the first namespace NS1 of the fourteenth storage device 1200_14. In operation S707, the storage node 1100 may receive the attribute information from the fourteenth storage device 1200_14. The fourteenth storage device 1200_14 may send the storage attribute information of the first namespace NS1 to the storage node 1100 in response to the attribute information request. For example, the fourteenth storage device 1200_14 may send the attribute information including the first storage attribute A1 to the storage node 1100. The storage node 1100 may determine that the first namespace NS1 of the fourteenth storage device 1200_14 has the first storage attribute A1, based on the received attribute information.

In operation S708, the storage node 1100 may send the attribute information request to the second namespace NS2 of the fourteenth storage device 1200_14. In operation S709, the storage node 1100 may receive the attribute information from the fourteenth storage device 1200_14. The fourteenth storage device 1200_14 may send the storage attribute information of the second namespace NS2 to the storage node 1100 in response to the attribute information request. For example, the fourteenth storage device 1200_14 may send the attribute information including the second storage attribute A2 to the storage node 1100. The storage node 1100 may determine that the second namespace NS2 of the fourteenth storage device 1200_14 has the second storage attribute A2, based on the received attribute information.

Referring to FIG. 13C, the storage node 1100 may select the optimal recovery sequence for the first namespace NS1 of the fourteenth storage device 1200_14. The storage node 1100 may select the optimal recovery sequence based on the recovery sequence table RST. Because the fourteenth virtual machine VM14 has the second workload characteristic C2, the storage node 1100 may refer to the second recovery table RT2. Because the first namespace NS1 of the fourteenth storage device 1200_14 has the first storage attribute A1, the storage node 1100 may select the recovery sequence corresponding to the first storage attribute A1 from the second recovery table RT2. That is, the storage node 1100 may select information about the optimal recovery sequence for the first storage attribute A1 (i.e., information about the third recovery sequence being the sequence having the order of the first recovery operation ROP1, the second recovery operation ROP2, the third recovery operation ROP3, and the fourth recovery operation ROP4).

In operation S710, the storage node 1100 may provide the first namespace NS1 of the fourteenth storage device 1200_14 with the optimal recovery sequence including the third recovery sequence (i.e., the sequence having the order of the first recovery operation ROP1, the second recovery operation ROP2, the third recovery operation ROP3, and the fourth recovery operation ROP4).

The storage node 1100 may select the optimal recovery sequence for the second namespace NS2 of the fourteenth storage device 1200_14. The storage node 1100 may select the optimal recovery sequence based on the recovery sequence table RST. Because the fifteenth virtual machine VM15 has the first workload characteristic C1, the storage node 1100 may refer to the first recovery table RT1. Because the second namespace NS2 of the fourteenth storage device 1200_14 has the second storage attribute A2, the storage node 1100 may select the recovery sequence corresponding to the second storage attribute A2 from the first recovery table RT1. That is, the storage node 1100 may select information about the optimal recovery sequence for the second storage attribute A2 (i.e., information about the second recovery sequence being the sequence having the order of the second recovery operation ROP2, the third recovery operation ROP3, the first recovery operation ROP1, and the fourth recovery operation ROP4).

In operation S711, the storage node 1100 may provide the second namespace NS2 of the fourteenth storage device 1200_14 with the optimal recovery sequence including the second recovery sequence (i.e., the sequence having the order of the second recovery operation ROP2, the third recovery operation ROP3, the first recovery operation ROP1, and the fourth recovery operation ROP4).

As described above, the storage node 1100 may provide a plurality of optimal recovery sequences to a storage device. That is, the storage node 1100 may provide the optimal recovery sequence for each namespace of the storage device. The storage device may apply different recovery sequences to namespaces of different attributes. The storage device may prevent the reduction of performance by performing the optimal recovery sequence for each namespace.

Figure 14:
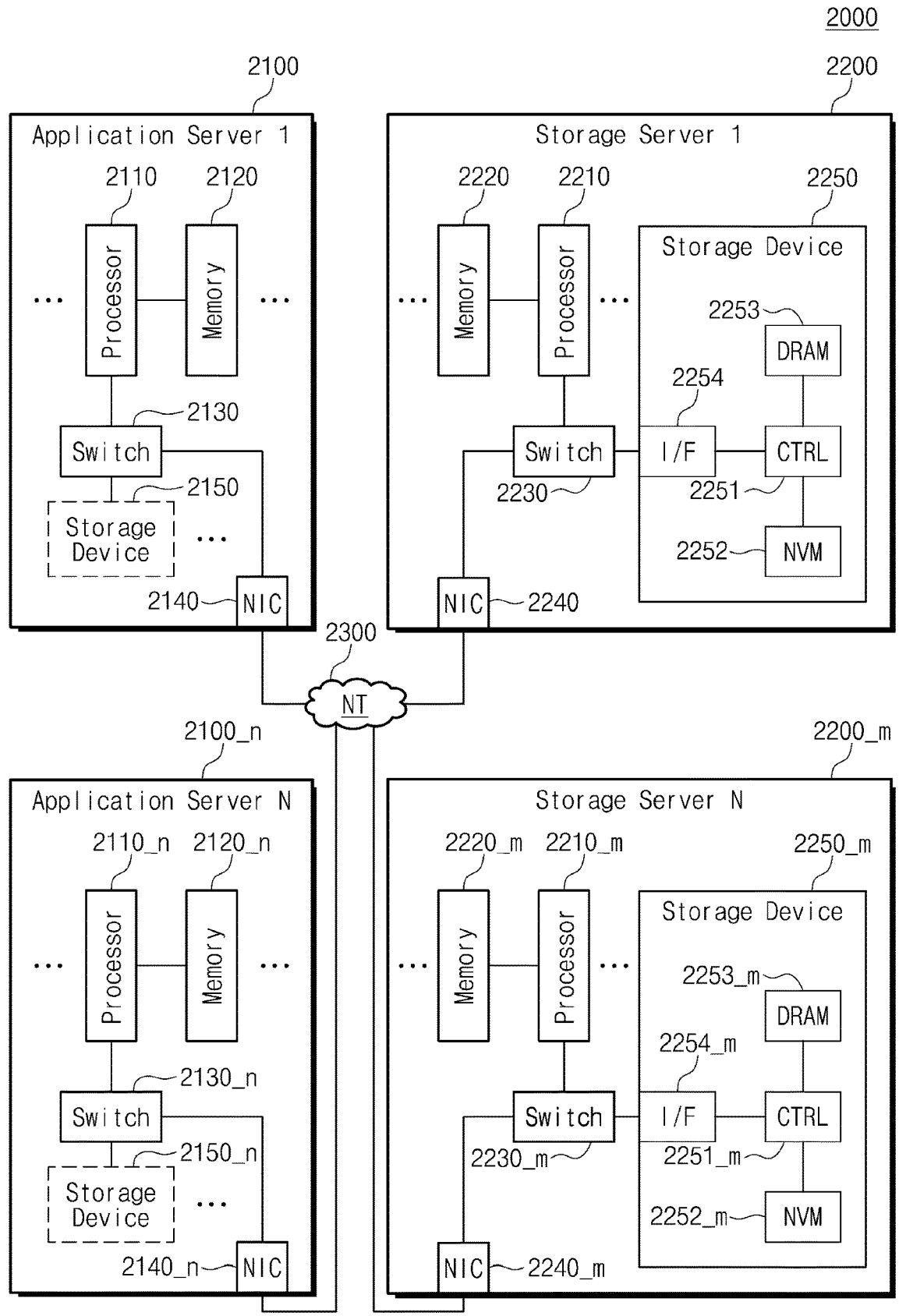
FIG. 14 is a diagram illustrating a data center to which a memory device according to an embodiment of the present disclosure is applied.

FIG. 14 is a diagram of a data center 2000 to which a memory device according to an embodiment is applied.

Referring to FIG. 14, the data center 2000 may be a facility that collects various types of pieces of data and provides services and be referred to as a data storage center. The data center 2000 may be a system for operating a search engine and a database, and may be a computing system used by companies, such as banks, or government agencies. The data center 2000 may include application servers 2100 to 2100_n and storage servers 2200 to 2200_m. The number of application servers 2100 to 2100_n and the number of storage servers 2200 to 2200_m may be variously determined according to embodiments. The number of application servers 2100 to 2100_n may be different from the number of storage servers 2200 to 2200_m.

The application server 2100 or the storage server 2200 may include at least one of processors 2110 and 2210 and memories 2120 and 2220. The storage server 2200 will now be described as an example. The processor 2210 may control all operations of the storage server 2200, access the memory 2220, and execute instructions and/or data loaded in the memory 2220. The memory 2220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 2210 and memories 2220 included in the storage server 2200 may be variously determined. In an embodiment, the processor 2210 and the memory 2220 may provide a processor-memory pair. In an embodiment, the number of processors 2210 may be different from the number of memories 2220. The processor 2210 may include a single-core processor or a multi-core processor. The above description of the storage server 2200 may be similarly applied to the application server 2100. In some embodiments, the application server 2100 may not include a storage device 2150. The storage server 2200 may include at least one storage device 2250. The number of storage devices 2250 included in the storage server 2200 may be variously determined according to embodiments.

The application servers 2100 to 2100_n may communicate with the storage servers 2200 to 2200_m through a network 2300. The network 2300 may be implemented by using a fiber channel (FC) or Ethernet. In this case, the FC may be a medium used for relatively high-speed data transmission and use an optical switch with high performance and high availability. The storage servers 2200 to 2200_m may be provided as file storages, block storages, or object storages according to an access method of the network 2300.

In an embodiment, the network 2300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 2300 may be a general network, such as a TCP/IP network. For example, the network 2300 may be implemented according to a protocol, such as FC over Ethernet (FCoE), network attached storage (NAS), and NVMe over Fabrics (NVMe-oF).

Hereinafter, the application server 2100 and the storage server 2200 will mainly be described. A description of the application server 2100 may be applied to another application server 2100_n, and a description of the storage server 2200 may be applied to another storage server 2200_m.

The application server 2100 may store data, which is requested by a user or a client to be stored, in one of the storage servers 2200 to 2200_m through the network 2300. Also, the application server 2100 may obtain data, which is requested by the user or the client to be read, from one of the storage servers 2200 to 2200_m through the network 2300. For example, the application server 2100 may be implemented as a web server or a database management system (DBMS).

The application server 2100 may access a memory 2120_n or a storage device 2150_n, which is included in another application server 2100_n, through the network 2300. Alternatively, the application server 2100 may access memories 2220 to 2220_m or storage devices 2250 to 2250_m, which are included in the storage servers 2200 to 2200_m, through the network 2300. Thus, the application server 2100 may perform various operations on data stored in application servers 2100 to 2100_n and/or the storage servers 2200 to 2200_m. For example, the application server 2100 may execute an instruction for moving or copying data between the application servers 2100 to 2100_n and/or the storage servers 2200 to 2200_m. In this case, the data may be moved from the storage devices 2250 to 2250_m of the storage servers 2200 to 2200_m to the memories 2120 to 2120_n of the application servers 2100 to 2100_n directly or through the memories 2220 to 2220_m of the storage servers 2200 to 2200_m. The data moved through the network 2300 may be data encrypted for security or privacy.

The storage server 2200 will now be described as an example. An interface 2254 may provide physical connection between a processor 2210 and a controller 2251 and a physical connection between a network interface card (NIC) 2240 and the controller 2251. For example, the interface 2254 may be implemented using a direct attached storage (DAS) scheme in which the storage device 2250 is directly connected with a dedicated cable. For example, the interface 2254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 2200 may further include a switch 2230 and the NIC (Network InterConnect) 2240. The switch 2230 may selectively connect the processor 2210 to the storage device 2250 or selectively connect the NIC 2240 to the storage device 2250 via the control of the processor 2210.

In an embodiment, the NIC 2240 may include a network interface card and a network adaptor. The NIC 2240 may be connected to the network 2300 by a wired interface, a wireless interface, a Bluetooth interface, or an optical interface. The NIC 2240 may include an internal memory, a digital signal processor (DSP), and a host bus interface and be connected to the processor 2210 and/or the switch 2230 through the host bus interface. The host bus interface may be implemented as one of the above-described examples of the interface 2254. In an embodiment, the NIC 2240 may be integrated with at least one of the processor 2210, the switch 2230, and the storage device 2250.

In the storage servers 2200 to 2200_m or the application servers 2100 to 2100_n, a processor (E.g., the processor 2110 or 2210) may transmit a command to storage devices 2150 to 2150_n and 2250 to 2250_m or the memories 2120 to 2120_n and 2220 to 2220_m and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 2150 to 2150_n and 2250 to 2250_m may transmit a control signal and a command/address signal to NAND flash memory devices 2252 to 2252_m in response to a read command received from the processor. Thus, when data is read from the NAND flash memory devices 2252 to 2252_m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 2251 may control all operations of the storage device 2250. In an embodiment, the controller 2251 may include an SRAM. The controller 2251 may write data to the NAND flash memory device 2252 in response to a write command or read data from the NAND flash memory device 2252 in response to a read command. For example, the write command and/or the read command may be provided from any one of the processors 2210 to 2210_m of the storage servers 2200 to 2200_m, and the processors 2110 to 2110_n of the application servers 2100 to 2100_n. DRAM 3253 may temporarily store (or buffer) data to be written to the NAND flash memory device 2252 or data read from the NAND flash memory device 2252. Also, the DRAM 3253 may store metadata. Here, the metadata may be user data or data generated by the controller 2251 to manage the NAND flash memory device 2252. The storage device 2250 may include a secure element (SE) for security or privacy.

In an embodiment, the storage servers 2200 to 2200_m may include the recovery manager described with reference to FIGS. 1 to 13C or may operate based on the method of providing the optimal recovery sequence, which is described with reference to FIGS. 1 to 13C. For example, based on the method described with reference to FIGS. 1 to 13C, the storage server 2200 may generate and manage the virtual machine group table VMGT, may collect recovery information, and may generate and manage the recovery sequence table RST.

In an embodiment, the storage server 2200 may provide the optimal recovery sequence to any other storage server (e.g., the storage server 2200_m) over the network NT. For example, the storage server 2200 may receive the optimal recovery sequence request including the workload characteristic and the storage attribute from the storage server 2200_m. The storage server 2200 may select the optimal recovery sequence with reference to the recovery sequence table RST, based on the workload characteristic and the storage attribute thus received. The storage server 2200 may provide the optimal recovery sequence to the storage server 2200_m over the network NT. The storage server 2200_m may transfer the received optimal recovery sequence to the storage device 2250_m. That is, the storage server 2200 may provide the optimal recovery sequence to the remote storage device 2250_m connected over the network NT.

In an embodiment, the storage server 2200 may provide or share the recovery sequence table RST to or with the storage server 2200_m over the network NT. The storage server 2200 may send the virtual machine group table VMGT, the collected recovery information, and/or the recovery sequence table RST to the storage server 2200_m over the network NT.

The storage server 2200_m may receive the virtual machine group table VMGT, the recovery information, and/or the recovery sequence table RST from the storage server 2200_m. The storage server 2200_m may monitor the recovery information and may not internally generate the recovery sequence table RST. The storage server 2200_m may provide the optimal recovery sequence to the storage device based on the recovery sequence table RST provided to the storage server 2200.

In the above example embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above example embodiments, components according to embodiments of the present disclosure are described by using a unit, a module, a layer, or a block. The unit, module, layer, or block may be implemented with various hardware devices, such as an integrated circuit (IC), an application specific IC (ASIC), a field programmable gate array (FPGA), and a complex programmable logic device (CPLD); firmware driven in hardware devices; software such as an application; or a combination of a hardware device and software. Also, the block may include circuits implemented with semiconductor elements in an integrated circuit, or circuits enrolled as an intellectual property (IP).

According to the present disclosure, a storage server with improved performance and an operation method of the storage server may be provided.

While the present disclosure has been described with reference to example embodiments thereof, it will be apparent to those of ordinary skill in the art that various changes and modifications may be made thereto without departing from the spirit and scope of the present disclosure as set forth in the following claims and their equivalents.

What is claimed is:

1. A method of operating a storage server which includes a plurality of storage devices and a storage node configured to control the plurality of storage devices, the method comprising:
grouping, by the storage node, first virtual machines based on workload characteristics of the first virtual machines, to generate a virtual machine group table;
receiving, by the storage node from first storage devices of the plurality of storage devices, attribute information of the first storage devices, the first storage devices being allocated to the first virtual machines;
collecting, by the storage node, recovery information from the first storage devices;
generating, by the storage node, a recovery sequence table by determining recovery sequences based on the virtual machine group table, the attribute information, and the recovery information; and
providing, by the storage node, a corresponding recovery sequence to a second storage device of the plurality of storage devices, based on the recovery sequence table, the second storage device being allocated to a new second virtual machine different from the first virtual machines.

2. The method of claim 1, wherein, based on an occurrence of a read error in the second storage device, recovery operations based on the corresponding recovery sequence of the second storage device are performed.

3. The method of claim 1, wherein the virtual machine group table includes a workload characteristic and information about an identifier of at least one virtual machine having the workload characteristic.

4. The method of claim 1, wherein the collecting the recovery information includes:
sending, by the storage node to a third storage device among the first storage devices, a read request upon which, based on an occurrence read error in the third storage device, recovery operations based on a default recovery sequence are performed and the recovery information is updated;
receiving, by the storage node from the third storage device, read data corresponding to the read request;
sending, by the storage node, a recovery information request to the third storage device; and
receiving, by the storage node, the updated recovery information in response to the recovery information request.

5. The method of claim 4, wherein the sending the recovery information request includes:
sending, to the third storage device, a "Get Log Page" command including a log identifier corresponding to the recovery information.

6. The method of claim 1, wherein the recovery sequence table includes a respective recovery sequence associated with a corresponding workload characteristic and corresponding attribute information.

7. The method of claim 1, wherein the providing the corresponding recovery sequence includes:
detecting, by the storage node, the second virtual machine;
extracting, by the storage node, a workload characteristic of the second virtual machine;
referring, by the storage node, to the virtual machine group table to determine a virtual machine group similar to the second virtual machine, based on the workload characteristic of the second virtual machine;
based on determining the virtual machine group similar to the second virtual machine, receiving, by the storage node, attribute information of the second storage device;
referring, by the storage node, to the recovery sequence table and selecting the corresponding recovery sequence based on the workload characteristic of the second virtual machine and the attribute information of the second storage device; and
providing, by the storage node, the selected corresponding recovery sequence to the second storage device.

8. The method of claim 7, wherein the receiving the attribute information includes:
sending, by the storage node, a "Get Log Page" command including a log identifier or a telemetry information request to the second storage device; and
receiving, by the storage node, the attribute information or telemetry information from the second storage device, based on the "Get Log Page" command or the telemetry information request.

9. The method of claim 1, wherein the workload characteristics includes at least one of a read intensive, a write intensive, a read ratio, a workload size, a work set size, cache status information, or a work flow.

10. The method of claim 1, wherein the attribute information includes at least one of a state of a nonvolatile memory, a type of the nonvolatile memory, a program manner, a number of programs and/or erase cycles, reliability, an access frequency, or a life.

11. The method of claim 1, wherein the determining the recovery sequences includes:
assigning, by the storage node, priorities to recovery operations based on comparing parameter values of the recovery operations; and
determining a recovery sequence based on priorities of the recovery operations.

12. The method of claim 11, wherein the parameter values include at least one of an error correction success ratio, a latency, an error correction ratio, or power consumption.

13. The method of claim 1, further comprising:
changing, by the storage node, the corresponding recovery sequence of the second storage device.

14. The method of claim 13, wherein the changing the corresponding recovery sequence includes:
sending, by the storage node, an attribute information request to the second storage device;
receiving, by the storage node, attribute information from the second storage device, based on the attribute information request;
determining, by the storage node, whether a recovery sequence change condition is satisfied, based on the attribute information of the second storage device;
based on the recovery sequence change condition being satisfied, selecting, by the storage node, a second corresponding recovery sequence by referring to the recovery sequence table based on changed attribute information of the second storage device;
providing, by the storage node, the second corresponding recovery sequence to the second storage device.

15. The method of claim 1, further comprising:
detecting, by the storage node, a new third virtual machine and a new fourth virtual machine;
allocating, by the storage node to the third virtual machine, a first namespace of a third storage device among the plurality of storage devices;

allocating, by the storage node to the fourth virtual machine, a second namespace of the third storage device;

providing, by the storage node, a second corresponding recovery sequence to the first namespace of the third storage device, based on the recovery sequence table; and providing, by the storage node, a third corresponding recovery sequence different from the second corresponding recovery sequence to the second namespace of the third storage device, based on the recovery sequence table.

16. A storage server comprising:

a plurality of storage devices; and a storage node configured to control the plurality of storage devices, wherein the storage node is configured to:

extract workload characteristics of first virtual machines by monitoring an input and an output between the first virtual machines and first storage devices, of the plurality of storage devices, allocated to the first virtual machines;

group the first virtual machines based on the workload characteristics and to generate a virtual machine group table;

receive attribute information from the first storage devices and to determine storage attributes of the first storage devices based on the received attribute information;

collect recovery information from the first storage devices;

generate a recovery sequence table by determining recovery sequences based on the virtual machine group table, the storage attributes, and the recovery information; and allocate a corresponding recovery sequence to a second storage device of the plurality of storage devices, the second storage device being allocated to a new second virtual machine, by referring to the recovery sequence table based on a workload characteristic of the second virtual machine and a storage attribute of the second storage device.

17. The storage server of claim 16, wherein the second storage device includes:

a nonvolatile memory; and a storage controller configured to control the nonvolatile memory, wherein, prior to receiving the corresponding recovery sequence from the storage node, the storage controller is configured to, based on an occurrence of a read error, perform recovery operations based on a default recovery sequence, and wherein, based on receiving the corresponding recovery sequence from the storage node, the storage controller is configured to, based on the occurrence of the read error, perform the recovery operations based on the received corresponding recovery sequence.

18. The storage server of claim 17, wherein the storage controller is configured to store, as the recovery information, a history of the recovery operations previously performed and send the recovery information to the storage node based on a recovery information request from the storage node.

19. A method of operating a storage server which includes a plurality of storage devices and a storage node configured to control the plurality of storage devices, the method comprising:

grouping, by the storage node, first virtual machines based on workload characteristics of the first virtual machines, to generate a virtual machine group table;

receiving, by the storage node, attribute information from first storage devices allocated to the first virtual machines;

collecting, by the storage node, recovery information from the first storage devices;

determining, by the storage node, recovery sequences based on the virtual machine group table, the attribute information, and the recovery information, to generate a recovery sequence table;

receiving a recovery sequence request including a second workload characteristic and a second storage attribute from an external storage server over a network; and referring to the recovery sequence table and providing a corresponding recovery sequence to the external storage server based on the second workload characteristic and the second storage attribute.

20. The method of claim 19, further comprising:

sending, by the storage node, the recovery sequence table to the external storage server.

* * * * *